(12) United States Patent
Ueda et al.

(10) Patent No.: US 12,534,880 B2
(45) Date of Patent: Jan. 27, 2026

(54) WORKING MACHINE

(71) Applicant: KUBOTA CORPORATION, Osaka (JP)

(72) Inventors: Kazuki Ueda, Osaka (JP); Yuji Fukuda, Osaka (JP); Ryota Hamamoto, Osaka (JP)

(73) Assignee: KUBOTA CORPORATION, Osaka (JP)

( * ) Notice: Subject to any disclaimer, the term of this patent is extended or adjusted under 35 U.S.C. 154(b) by 503 days.

(21) Appl. No.: 18/074,725

(22) Filed: Dec. 5, 2022

(65) Prior Publication Data

US 2023/0193596 A1 Jun. 22, 2023

(30) Foreign Application Priority Data

Dec. 17, 2021 (JP) .................................. 2021-205376

(51) Int. Cl.
*E02F 9/22* (2006.01)

(52) U.S. Cl.
CPC .......... *E02F 9/2253* (2013.01); *E02F 9/2296* (2013.01)

(58) Field of Classification Search
CPC ...... E02F 9/2253; E02F 9/2296; F16H 61/44; F16H 61/47

See application file for complete search history.

(56) References Cited

U.S. PATENT DOCUMENTS

| | | | |
|---|---|---|---|
| 2017/0107695 A1* | 4/2017 | Fukuda | E02F 9/2267 |
| 2017/0284063 A1 | 10/2017 | Fukuda et al. | |
| 2020/0263393 A1* | 8/2020 | Fukuda | E02F 9/2232 |
| 2021/0032841 A1* | 2/2021 | Ishihara | E02F 3/844 |

FOREIGN PATENT DOCUMENTS

| | | | | |
|---|---|---|---|---|
| JP | 2017179922 | | 10/2017 | |
| JP | 2020133202 A | * | 8/2020 | ............ E02F 9/2232 |
| WO | WO-2016051815 A1 | * | 4/2016 | ............ E02F 9/2228 |

OTHER PUBLICATIONS

English Translation of WO-2016051815-A1 (Year: 2025).*
English Translation of JP-2020133202-A (Year: 2025).*
Office Action issued in Japanese family member Patent Appl. No. 2021-205376, dated Aug. 20, 2024, along with an English translation thereof.

* cited by examiner

*Primary Examiner* — Erin M Piateski
*Assistant Examiner* — Gabriel Joseph Rene Lambert
(74) *Attorney, Agent, or Firm* — Greenblum & Bernstein, P.L.C.

(57) ABSTRACT

In a working machine, a controller decreases a supply amount of a hydraulic fluid from a travel pump to a travel motor based on a travel state of a machine body when a speed-change instruction of increasing or decreasing speed is output by operating a switch, and a pressure detector detects a travel pressure that is a pressure of a hydraulic fluid delivered by the travel pump to the travel motor. In accordance with the travel pressure detected by the travel pressure detector, the controller changes a delay period lasting up to a switching timing of the travel switching valve from an output timing of the speed-change instruction of the switch.

18 Claims, 23 Drawing Sheets

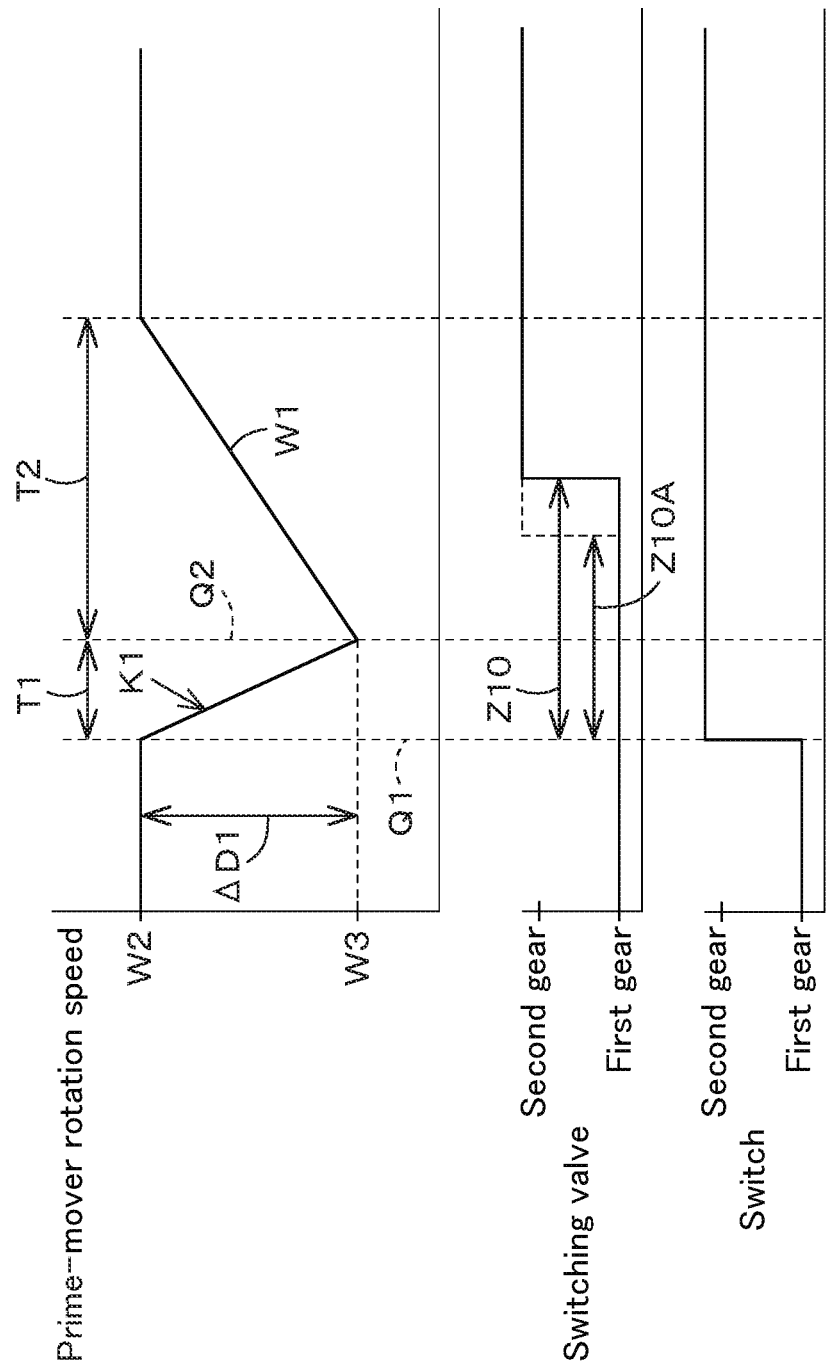

In the case of rotation speed RTn of prime mover

| Speed change | First pattern (first value) | Second pattern (central value) | Third pattern (second value) | Threshold value |
|---|---|---|---|---|
| First gear to second gear | 40 msec | 60 msec | 80 msec | First threshold value |
| Second gear to first gear | 660 msec | 680 msec | 700 msec | Second threshold value |

Fig.2C

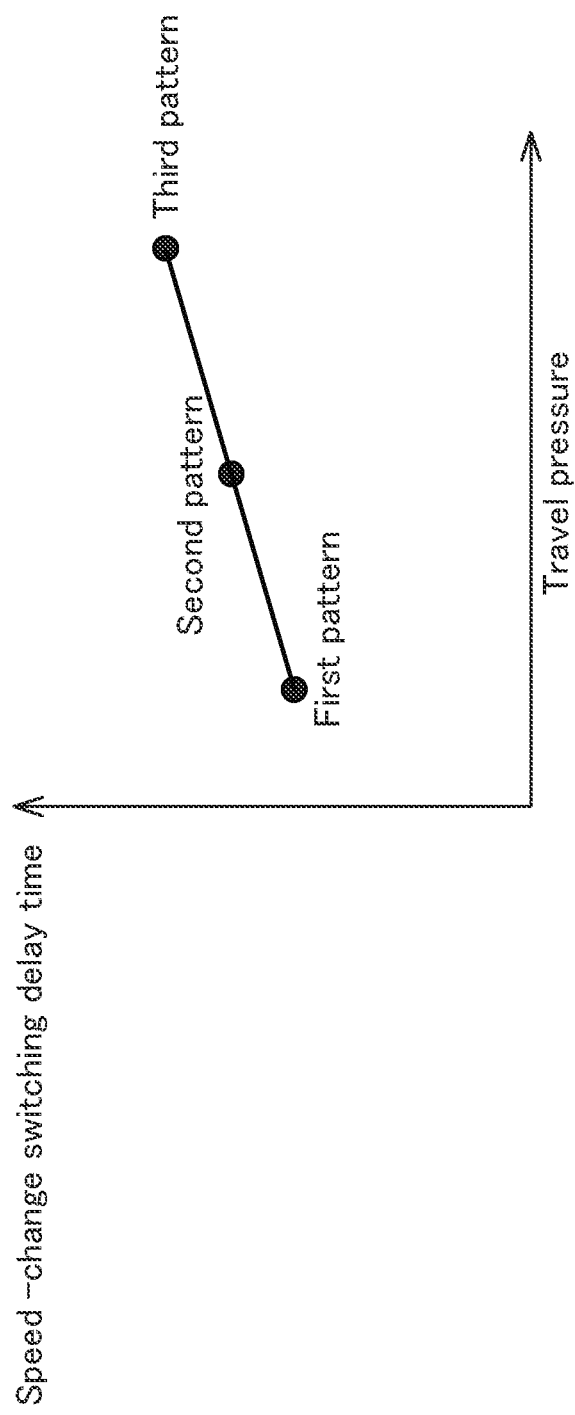

| Actual rotation speed W1 (rpm) | Travel pilot pressure (MPa) | Decrease amount D1 (rpm) | Minimum prime-mover rotation speed W3,W4 (rpm) |
|---|---|---|---|
| 3000 | 2.5 | 1000 | 2000 |
|  | 2.0 | 750 | 2250 |
|  | 1.5 | 500 | 2500 |
|  | 1.0 | 250 | 2750 |
|  | 0.5 | 0 | 3000 |
|  | 0 | 0 | 3000 |
| 2500 | 2.5 | 750 | 1750 |
|  | 2.0 | 563 | 1938 |
|  | 1.5 | 375 | 2125 |
|  | 1.0 | 188 | 2313 |
|  | 0.5 | 0 | 2500 |
|  | 0 | 0 | 2500 |
| 2000 | 2.5 | 500 | 1500 |
|  | 2.0 | 375 | 1625 |
|  | 1.5 | 250 | 1750 |
|  | 1.0 | 125 | 1875 |
|  | 0.5 | 0 | 2000 |
|  | 0 | 0 | 2000 |
| 1500 | 2.5 | 250 | 1250 |
|  | 2.0 | 188 | 1313 |
|  | 1.5 | 125 | 1375 |
|  | 1.0 | 63 | 1438 |
|  | 0.5 | 0 | 1500 |
|  | 0 | 0 | 1500 |
| 1000 | 2.5 | 0 | 1000 |
|  | 2.0 | 0 | 1000 |
|  | 1.5 | 0 | 1000 |
|  | 1.0 | 0 | 1000 |
|  | 0.5 | 0 | 1000 |
|  | 0 | 0 | 1000 |

| Travel speed (vehicle speed) | Travel pilot pressure (MPa) | Decrease amount D2 (MPa) | Minimum pilot pressure (MPa) |
|---|---|---|---|
| 10km/h | 2.5 | 1.00 | 1.5 |
| 7.5km/h | 2.0 | 0.75 | 1.25 |
| 5.0km/h | 1.5 | 0.50 | 1 |
| 2.5km/h | 1.0 | 0.25 | 0.75 |
| 0 | 0.5 | 0 | 0.5 |
| 0 | 0 | 0 | 0 |

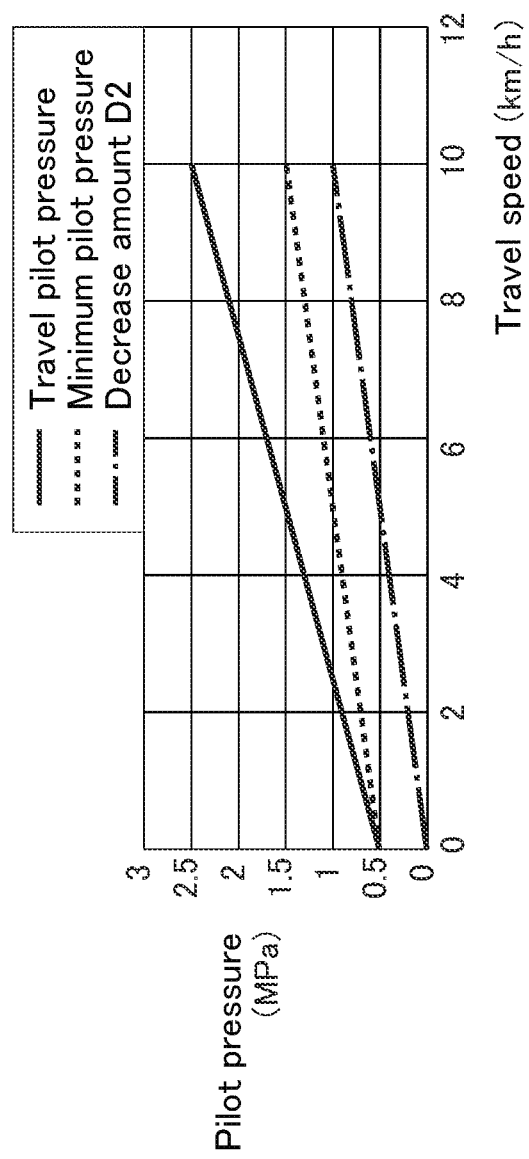

WORKING MACHINE

CROSS REFERENCE TO RELATED APPLICATIONS

This application claims the benefit of priority to Japanese Patent Application No. 2021-205376 filed on Dec. 17, 2021. The entire contents of this application are hereby incorporated herein by reference.

BACKGROUND OF THE INVENTION

1. Field of the Invention

The present invention relates to a working machine, such as a skid-steer loader, a compact track loader, or a backhoe.

2. Description of the Related Art

To date, a technology that decreases and increases the speed of a working machine is disclosed in Japanese Unexamined Patent Application Publication No. 2017-179922. The working machine disclosed in Japanese Unexamined Patent Application Publication No. 2017-179922 above includes a prime mover, a hydraulic pump that operates by the operation of the prime mover and delivers a hydraulic fluid, a hydraulic switching valve that is switchable to a plurality of switching positions in accordance with the pressure of the hydraulic fluid, a proportional valve that is capable of changing a hydraulic fluid that acts on the hydraulic switching valve, a travel hydraulic device that is capable of changing the speed in accordance with the switching position of the hydraulic switching valve, and a controller that controls the proportional valve in accordance with, for example, a travel state of the working machine or a state of the prime mover.

SUMMARY OF THE INVENTION

In the working machine disclosed in Japanese Unexamined Patent Application Publication No. 2017-179922 above, when changing the speed, that is, when decreasing the speed of the working machine, in order to change the pressure characteristics of the switching of the hydraulic switching valve, measures are taken to reduce a speed-change shock (impact or a sense of discomfort). However, in a working machine in which there is a shift in a speed-change timing resulting from variations in a delay in responding to the rotation of hydraulic equipment or the prime mover, the speed-change shock may not be reduced. In such a working machine, an adjustment of reducing the speed-change shock cannot be performed.

Embodiments of the present invention have been made to solve the problems of the related art as those described above, and an object of the present invention is to make it possible to perform an adjustment of reducing a speed-change shock of a working machine.

Embodiments according to the present invention for solving the technical problems are as follows.

In an aspect of the present invention, a working machine includes a prime mover; a travel pump driven by power of the prime mover to deliver a hydraulic fluid: a travel motor rotated by the hydraulic fluid delivered by the travel pump: a machine body where the prime mover, the travel pump, and the travel motor are provided: a travel switching valve switchable to a first state in which a rotation speed of the travel motor is capable of being increased up to a first maximum speed, and to a second state in which the rotation speed of the travel motor is capable of being increased up to a second maximum speed that is greater than the first maximum speed: a travel operation device including an operation valve operable to change a pressure of a hydraulic fluid to operate the travel pump in accordance with an operation of an operation member: a controller configured or programmed to decrease a supply amount of a hydraulic fluid from the travel pump to the travel motor based on a travel state of the machine body when performing either one of a speed-increase operation of switching the travel switching valve from the first state to the second state and a speed-decrease operation of switching the travel switching valve from the second state to the first state; a switch operable to output a speed-change instruction such as to cause the controller to perform; and at least one travel pressure detector to detect, a travel pressure that is a pressure of the hydraulic fluid delivered by the travel pump to the travel motor. In accordance with the travel pressure detected by the at least one travel pressure detector, the controller changes a delay period lasting up to a switching timing of switching the travel switching valve from an output timing of outputting the speed-change instruction from the switch.

In an aspect of the present invention, in the working machine, the at least one travel pressure detector may include a first travel pressure detector to detect a forward-travel-directional travel pressure that is a pressure of the hydraulic fluid supplied from the travel pump to the travel motor to rotate the travel motor forward. The controller, when performing the speed-increase operation or the speed-decrease operation, may change the delay period in accordance with the forward-travel-directional travel pressure detected by the first travel pressure detector.

In an aspect of the present invention, in the working machine, the at least one travel pressure detector may include a first travel pressure detector to detect a forward-travel-directional travel pressure that is a pressure of a hydraulic fluid supplied from the travel pump to the travel motor to rotate the travel motor in a normal direction to cause forward travel of the machine body, and a second travel pressure detector to detect a rearward-travel-directional travel pressure that is a pressure of the hydraulic fluid delivered from the travel motor to the travel pump when the travel motor rotates in the normal direction. The controller, when performing the speed-increase operation or the speed-decrease operation, may change the delay period in accordance with a difference between the forward-travel-directional travel pressure detected by the first travel pressure detector and the rearward-travel-directional travel pressure detected by the second travel pressure detector.

In an aspect of the present invention, in the working machine, the controller, when performing the speed-increase operation, may decrease the delay period if the forward-travel-directional travel pressure detected by the first travel pressure detector exceeds a threshold value.

In an aspect of the present invention, in the working machine, the controller, when performing the speed-decrease operation, may decrease the delay period if the forward-travel-directional travel pressure detected by the first travel pressure detector exceeds a threshold value.

In an aspect of the present invention, in the working machine, the at least one travel pressure detector may include a second travel pressure detector to detect a rearward-travel-directional travel pressure that is a pressure of the hydraulic fluid delivered from the travel motor to the travel pump when the travel motor rotates in the normal direction. The controller, when performing the speed-decrease operation, may increase the delay period if the rearward-travel-directional travel pressure detected by the second travel pressure detector exceeds a threshold value.

In an aspect of the present invention, in the working machine, the controller, when performing the speed-increase operation, may decrease the delay period if the difference between the forward-travel-directional travel pressure detected by the first travel pressure detector and the rearward-travel-directional travel pressure detected by the second travel pressure detector is a positive value and an absolute value of the difference exceeds a determination value.

In an aspect of the present invention, in the working machine, the controller, when performing the speed-decrease operation, may decrease the delay period if the difference between the forward-travel-directional travel pressure detected by the first travel pressure detector and the rearward-travel-directional travel pressure detected by the second travel pressure detector is a positive value and an absolute value of the difference exceeds a determination value.

In an aspect of the present invention, in the working machine, the controller, when performing the speed-decrease operation, may increase the delay period if the difference between the forward-travel-directional travel pressure detected by the first travel pressure detector and the rearward-travel-directional travel pressure detected by the second travel pressure detector is a negative value and an absolute value of the difference exceeds a determination value.

In an aspect of the present invention, in the working machine, when a mode is a setting mode of setting a speed-change switching timing, the controller may change the delay period.

In an aspect of the present invention, in the working machine, the at least one travel pressure detector may include a first travel pressure detector to detect a rearward-travel-directional travel pressure that is a pressure of a hydraulic fluid that is supplied from the travel pump to the travel motor when the travel motor rotates in a reverse direction to cause rearward travel of the machine body. The controller, when performing the speed-increase operation or the speed-decrease operation, may change the delay period in accordance with the rearward-travel-directional travel pressure detected by the first travel pressure detector.

In an aspect of the present invention, the working machine may further include a memory including a memory table to store at least the threshold value, a central value indicating a predetermined period from an output timing of outputting the speed-change instruction from the switch, and a first value indicating a first period that is shorter than the period indicated by the central value; and a rotation detector to detect a rotation speed of the prime mover. The memory may store each of the threshold value, the central value, and the first value corresponding to the rotation speed of the prime mover. When the operation member is operated for the forward travel and the controller performs the speed-increase operation or the speed-decrease operation, the controller may determine whether the forward-travel-directional travel pressure detected by the first travel pressure detector exceeds the threshold value by using the threshold value, the central value, and the first value corresponding to the rotation speed of the prime mover detected by the rotation detector. When the controller determines that the threshold value is not exceeded, the controller may cause the central value to be the delay period, and when the controller determines that the threshold value is exceeded, the controller may cause the first value to be the delay period.

In an aspect of the present invention, the working machine may further include a memory including a memory table to store at least the threshold value, a central value indicating a predetermined period from an output timing of outputting the speed-change instruction from the switch, and a second value indicating a second period that is longer than the period indicated by the central value; and a rotation detector to detect a rotation speed of the prime mover. The memory may store each of the threshold value, the central value, and the second value corresponding to the rotation speed of the prime mover. When the operation member is operated for the forward travel and the controller performs the speed-decrease operation, the controller may determine whether the rearward-traveling-directional travel pressure detected by the second travel pressure detector exceeds the threshold value by using the threshold value, the central value, and the second value corresponding to the rotation speed of the prime mover detected by the rotation detector. When the controller determines that the threshold value is not exceeded, the controller may cause the central value to be the delay period, and when the controller determines that the threshold value is exceeded, the controller may cause the second value to be the delay period in place of the central value.

In an aspect of the present invention, in the working machine, the threshold value when the speed-increase operation is performed and the threshold value when the speed-decrease operation is performed may differ from each other.

In an aspect of the present invention, the working machine may further include a gradient detector to detect a pitch angle of the machine body. During forward or rearward ravel of the machine body, if the pitch angle detected by the gradient detector is a positive value, the controller may correct the delay period so that the delay period is decreased in accordance with a magnitude of the pitch angle, and if the pitch angle detected by the gradient detector is a negative value, the controller may correct the delay period so that the delay period is increased in accordance with the magnitude of the pitch angle.

In an aspect of the present invention, the working machine, in a setting mode of setting a speed-change switching timing, during the forward or rearward travel of the machine body moves forward or rearward, if the pitch angle detected by the gradient detector is a positive value, the controller may correct a threshold value so that the threshold value is increased in accordance with the magnitude of the pitch angle, and if the pitch angle detected by the gradient detector is a negative value, the controller may correct the threshold value so that the threshold value is decreased in accordance with the magnitude of the pitch angle.

In an aspect of the present invention, in the working machine, in a user switching mode in which a user sets a speed-change switching timing, when the operation member is operated for the forward travel and the controller performs the speed-increase operation or the speed-decrease operation, the controller may determine whether the forward-travel-directional travel pressure detected by the first travel pressure detector exceeds the threshold value. When the controller determines that the threshold value is not exceeded, the controller may cause the central value to be the delay period, and when the controller determines that the threshold value is exceeded, the controller may cause the first value to be the delay period in place of the central value.

In an aspect of the present invention, the working machine may further include a memory including a memory table to store at least a threshold value, a central value indicating a predetermined period from an output timing of outputting the speed-change instruction from the switch, and a first value indicating a first period that is shorter than the period indicated by the central value. In a user switching mode in which a user sets a speed-change switching timing, when the operation member is operated for rearward travel of the machine body and the controller performs the speed-decrease operation, the controller may determine whether the rearward-travel-directional travel pressure detected by the first travel pressure detector exceeds the threshold value. When the controller determines that the threshold value is not exceeded, the controller may cause the central value to be the delay period, and when the controller determines that the threshold value is exceeded, the controller may cause the first value to be the delay period in place of the central value.

In an aspect of the present invention, in the working machine, in an ordinary mode that is not a setting mode of setting a speed-change switching timing, when the operation member is operated for the forward travel and the controller performs the speed-increase operation or the speed-decrease operation, the controller may determine whether the forward-travel-directional travel pressure detected by the first travel pressure detector exceeds the threshold value. When the controller determines that the threshold value is exceeded, the controller may store in the memory a determination result that the threshold value is exceeded, and when the number of determination results reaches a predetermined actual number, the controller may cause the first value to be the delay period in place of the central value.

In an aspect of the present invention, the working machine may further include a memory including a memory table to store at least a threshold value, a central value indicating a predetermined period from an output timing of outputting the speed-change instruction from the switch, and a first value indicating a first period that is shorter than the period indicated by the central value. In an ordinary mode that is not a setting mode of setting a speed-change switching timing, when the operation member is operated for the rearward travel of the machine body and the controller performs the speed-decrease operation, the controller may determine whether the rearward-travel-directional travel pressure detected by the first travel pressure detector exceeds the threshold value. When the controller determines that the threshold value is exceeded, the controller may store in the memory a determination result that the threshold value is exceeded. When the number of determination results does not reach a predetermined actual number, the controller may cause the central value to be the delay period and when the number of determination results reaches the predetermined actual number, the controller may cause the first value to be the delay period.

The above and other elements, features, steps, characteristics and advantages of the present invention will become more apparent from the following detailed description of the preferred embodiments with reference to the attached drawings.

BRIEF DESCRIPTION OF THE DRAWINGS

A more complete appreciation of preferred embodiments of the present invention and many of the attendant advantages thereof will be readily obtained as the same becomes better understood by reference to the following detailed description when considered in connection with the accompanying drawings described below.

FIG. 2A illustrates the relationship between the rotation speed of a prime mover when the speed of a travel motor is increased, and switching of the travel motor.

FIG. 2C illustrates an example of a memory table.

FIG. 2D is a graph showing a change in a delay period on the basis of a forward-travel-directional travel pressure and a rearward-travel-directional travel pressure.

FIG. 8A is a table showing the relationship between an actual rotation speed of a prime mover, a travel pilot pressure, and a decrease amount of the rotation speed of the prime mover.

FIG. 9A is a table showing the relationship between a travel pilot pressure and a decrease amount of the travel pilot pressure.

FIG. 9B is a graph of FIG. 9A.

DETAILED DESCRIPTION OF THE PREFERRED EMBODIMENTS

Figure 1:
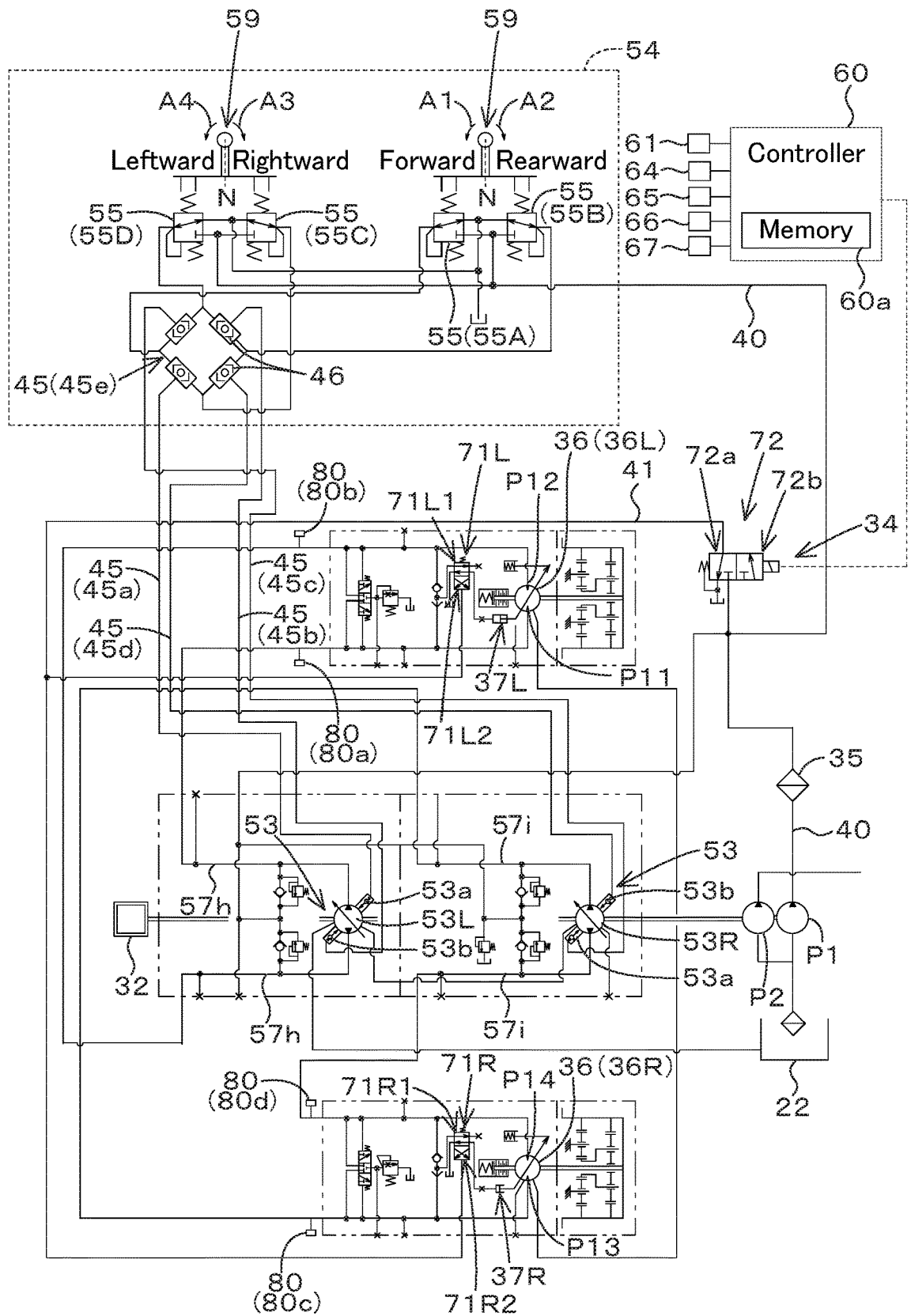
FIG. 1 illustrates a hydraulic system (hydraulic circuit) of a working machine in a first embodiment.

The preferred embodiments will now be described with reference to the accompanying drawings, wherein like reference numerals designate corresponding or identical elements throughout the various drawings. The drawings are to be viewed in an orientation in which the reference numerals are viewed correctly.

Preferred embodiments of a hydraulic system of a working machine and a working machine including the hydraulic system according to the present invention are described below with reference to the drawings as appropriate.

First Embodiment

Figure 10:
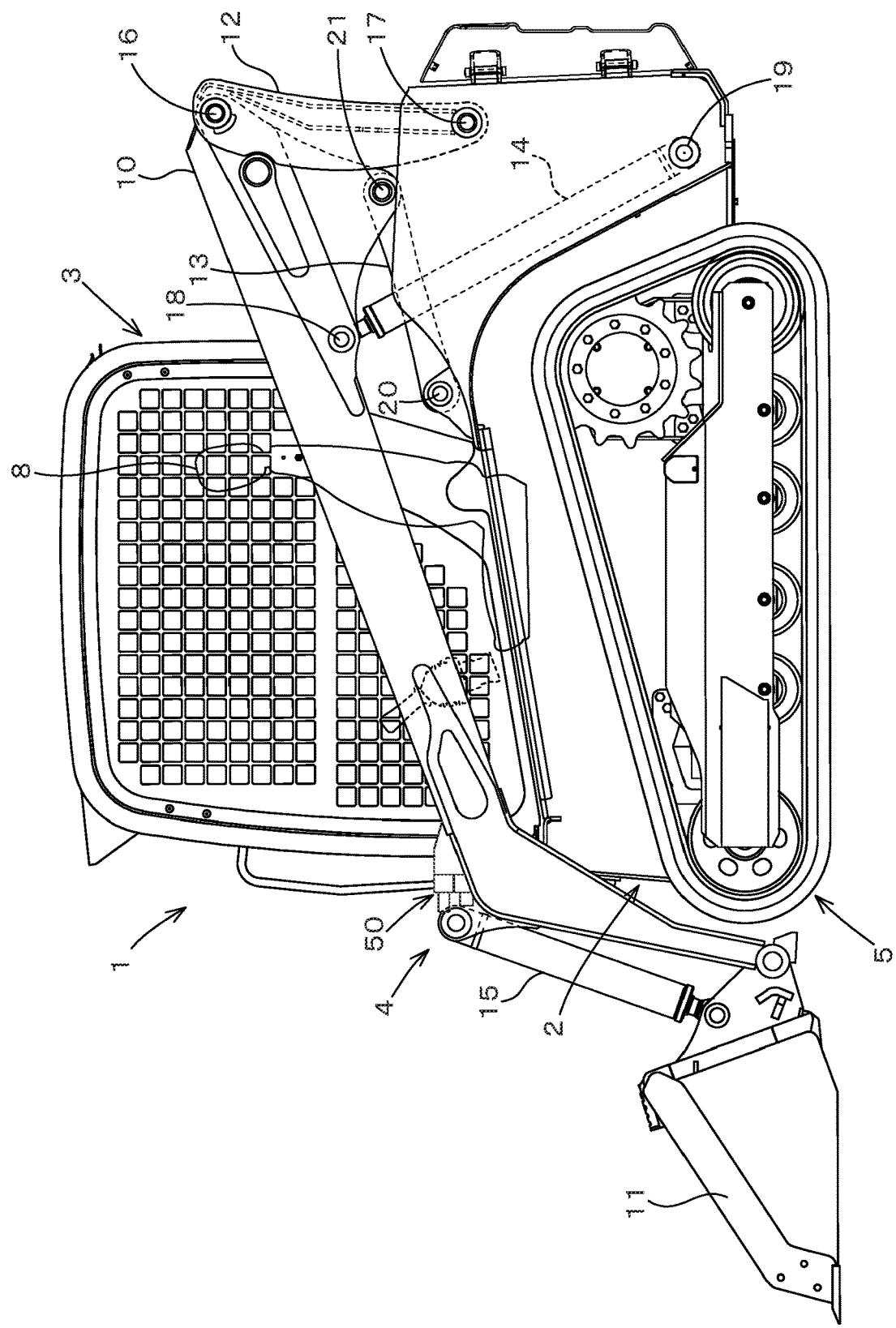
FIG. 10 is a side view of a track loader, which is an example of a working machine.

FIG. 10 is a side view of a working machine 1 according to the present invention. FIG. 10 illustrates a compact track loader as an example of the working machine 1. However, the working machine according to the present invention is not limited to a compact track loader, and may be, for example, another type of loader working machine, such as a skid-steer loader. Alternatively, the working machine may be a working machine other than a loader working machine.

As shown in FIG. 10, the working machine 1 includes a machine body 2, a cabin 3, a working device 4, and at least one traveling device 5. In the first embodiment of the present invention, a direction that an operator seated on an operator's seat 8 of the working machine 1 faces (left side in FIG. 10) is a forward direction, and the opposite direction (right side in FIG. 10) is a rearward direction. A left side of the operator (near side in FIG. 10) is a leftward direction, and a right side of the operator (far side in FIG. 10) is a rightward direction. Note that a horizontal direction that is a direction orthogonal to a front-rear direction is a machine-body width direction, and a direction from a central portion of the machine body 2 toward a right portion or a left portion thereof is a machine-body outward direction. In other words, the machine-body outward direction is a machine-body width direction and a direction away from the machine body 2. A direction opposite to the machine-body outward direction is a machine-body inward direction. In other words, the machine-body inward direction is a machine-body width direction and a direction toward the machine body 2.

The cabin 3 is installed on the machine body 2. The operator's seat 8 is provided at the cabin 3. The working device 4 is mounted on the machine body 2. The at least one traveling device 5 is provided on an outer side of the machine body 2. A prime mover 32 is installed at a rear portion inside the machine body 2.

The working device 4 has at least one boom 10, a bucket 11, which is an example of a working tool, at least one lift link 12, at least one control link 13, at least one boom cylinder 14, and at least one bucket cylinder 15.

The at least one boom 10 includes booms 10 that are provided, one on the right side and the other on the left side of the cabin 3. The bucket 11 is provided on an end portion (front end portion) of each boom 10 so as to be swingable upward and downward. The at least one lift link 12 and the at least one control link 13 support a base portion (rear portion) of each boom 10 so that each boom 10 is swingable upward and downward. The at least one boom cylinder 14 extends and contracts to raise and lower the booms 10. The at least one bucket cylinder 15 extends and contracts to swing the bucket 11.

The front end portion of the left boom 10 and the front end portion of the right boom 10 are connected to each other by an oddly shaped connection pipe. The base portions (rear portions) of the respective booms 10 are connected to each other by a circular connection pipe.

The at least one lift link 12 includes lift links 12, the at least one control link 13 includes control links 13, and the at least one boom cylinder 14 includes boom cylinders 14. The lift links 12, the control links 13, and the boom cylinders 14 are provided on a corresponding one of the left side and the right side of the machine body 2 in correspondence with a corresponding one of the left boom 10 and the right boom 10.

The lift links 12 are provided vertically on a rear portion of the base portion of a corresponding one of the booms 10. An upper portion (one end) of each lift link 12 is pivotally supported so as to be rotatable around a lateral axis via a pivoted shaft (for example, a first pivoted shaft 16) situated toward the rear portion of the base portion of each boom 10. A lower portion (the other end) of each lift link 12 is pivotally supported so as to be rotatable around a lateral axis via a pivoted shaft (for example, a second pivoted shaft 17) situated toward the rear portion of the machine body 2. The second pivoted shaft 17 is provided below the first pivoted shaft 16.

An upper portion of each boom cylinder 14 is pivotally supported so as to be rotatable around a lateral axis via a pivoted shaft (for example, a third pivoted shaft 18). The third pivoted shaft 18 is the base portion of each boom 10, and is provided at a front portion of the base portion. A lower portion of each boom cylinder 14 is pivotally supported so as to be rotatable around a lateral axis via a pivoted shaft (for example, a fourth pivoted shaft 19). The fourth pivoted shaft 19 is provided toward a lower portion of the rear portion of the machine body 2 and below the third pivoted shaft 18.

The control links 13 are provided forward of the lift links 12. One end of each control link 13 is pivotally supported so as to be rotatable around a lateral axis via a pivoted shaft (for example, a fifth pivoted shaft 20). The fifth pivoted shaft 20 is provided at a position, forward of the lift links 12, on the machine body 2. The other end of each control link 13 is pivotally supported so as to be rotatable around a lateral axis via a pivoted shaft (for example, a sixth pivoted shaft 21). The sixth pivoted shaft 21 is provided on each boom 10 so as to be situated forward of the second pivoted shaft 17 and above the second pivoted shaft 17.

Due to extension and contraction of the boom cylinders 14, while the base portions of the booms 10 are supported by the lift links 12 and the control links 13, the booms 10 swing upward and downward around the first pivoted shaft 16, and the end portions of the booms 10 are raised and lowered. The control links 13 swing upward and downward around the fifth pivoted shaft 20 as the booms 10 swing upward and downward. The lift links 12 swing forward and rearward around the second pivoted shaft 17 as the control links 13 swing upward and downward.

Instead of the bucket 11, a different working tool can be mounted on a front portion of each boom 10. As a different working tool, there exists an attachment (auxiliary attachment) of, for example, a hydraulic crusher, a hydraulic breaker, an angle broom, an earth auger, a pallet fork, a sweeper, a mower, or a snow blower.

A connecting member 50 is provided on a front end of the left boom 10. The connecting member 50 is a device that connects hydraulic equipment that is provided at the auxiliary attachment and a first tubular material, such as a pipe, that is provided at each boom 10 to each other. Specifically, the first tubular material is connectable to one end of the connecting member 50, and a second tubular material that is connected to the hydraulic equipment of the auxiliary attachment is connectable to the other end of the connecting member 50. Therefore, a hydraulic fluid that flows in the first tubular material passes through the second tubular material and is supplied to the hydraulic equipment.

The at least one bucket cylinder 15 includes bucket cylinders 15 that are each disposed toward the front portion of a corresponding one of the booms 10. Due to extension and contraction of each bucket cylinder 15, the bucket 11 is swung.

The at least one traveling device 5 includes left and right traveling devices (a first traveling device and a second traveling device) 5, and, in the embodiment, crawler (including semicrawler) traveling devices are used. Note that wheeled traveling devices having a front wheel and a rear wheel may be used.

The prime mover 32 is, for example, an internal combustion engine, such as a diesel engine or a gasoline engine, or an electric motor. Although, in the embodiment, the prime mover 32 is a diesel engine, the prime mover 32 is not limited thereto.

Next, a hydraulic system of the working machine 1 is described.

As shown in FIG. 1, the hydraulic system of the working machine 1 is capable of driving the traveling devices 5. The hydraulic system of the working machine 1 includes a first travel pump 53L, a second travel pump 53R, a first travel motor 36L, and a second travel motor 36R.

The first travel pump 53L and the second travel pump 53R are pumps that are driven by power of the prime mover 32. Specifically, the first travel pump 53L and the second travel pump 53R are swash-plate variable displacement axial pumps that are driven by the power of the prime mover 32. The first travel pump 53L and the second travel pump 53R each have a forward-travel pressure receiver 53a and a rearward-travel pressure receiver 53b upon which pilot pressure acts. The swash-plate angles of the first travel pump 53L and the second travel pump 53R are each changed by the pilot pressure that acts upon the forward-travel pressure receiver 53a and the rearward-travel pressure receiver 53b. Outputs of the first travel pump 53L and the second travel pump 53R (delivery amounts of hydraulic fluid) and delivery directions of the hydraulic fluid can be changed by changing the swash-plate angles.

The first travel pump 53L and the first travel motor 36L are connected to each other by a circulation fluid passage 57h, and a hydraulic fluid delivered from the first travel pump 53L is supplied to the first travel motor 36L. The second travel pump 53R and the second travel motor 36R are connected to each other by a circulation fluid passage 57i, and a hydraulic fluid delivered from the second travel pump 53R is supplied to the second travel motor 36R.

The first travel motor 36L is a motor that transmits power to a drive shaft of the traveling device 5 provided on the left side of the machine body 2. The first travel motor 36L is rotatable by the hydraulic fluid delivered from the first travel pump 53L, and its rotation speed can be changed by the flow rate of the hydraulic fluid. A swash-plate switching cylinder 37L is connected to the first travel motor 36L, and the rotation speed of the first travel motor 36L can be changed even by extending and contracting the swash-plate switching cylinder 37L in one direction or in the other direction. That is, when the swash-plate switching cylinder 37L is contracted, the rotation speed of the first travel motor 36L is set at a low speed (a first speed region up to a first maximum speed: hereunder abbreviated as "first speed" as appropriate), and, when the swash-plate switching cylinder 37L is extended, the rotation speed of the first travel motor 36L is set at a high speed (a second speed region up to a second maximum speed that is greater than the first maximum speed: hereunder abbreviated as "second speed" as appropriate). That is, the rotation speed of the first travel motor 36L can be changed to the first speed that is the low speed and to the second speed that is the high speed.

The second travel motor 36R is a motor that transmits power to a drive shaft of the traveling device 5 provided on the right side of the machine body 2. The second travel motor 36R is rotatable by the hydraulic fluid delivered from the second travel pump 53R, and its rotation speed can be changed by the flow rate of the hydraulic fluid. A swash-plate switching cylinder 37R is connected to the second travel motor 36R, and the rotation speed of the second travel motor 36R can be changed even by extending and contracting the swash-plate switching cylinder 37R in one direction or in the other direction. That is, when the swash-plate switching cylinder 37R is contracted, the rotation speed of the second travel motor 36R is set at a low speed (first speed), and, when the swash-plate switching cylinder 37R is extended, the rotation speed of the second travel motor 36R is set at a high speed (second speed). That is, the rotation speed of the second travel motor 36R can be changed to the first speed that is the low speed and to the second speed that is the high speed.

As shown in FIG. 1, the hydraulic system of the working machine 1 includes a travel switching valve 34. The travel switching valve 34 is switchable to a first state in which the rotation speeds of the travel motors 36 (the first travel motor 36L and the second travel motor 36R) can be increased up to the first maximum speed and to a second state in which the rotation speeds can be increased up to the second maximum speed that is greater than the first maximum speed. The travel switching valve 34 has first switching valves 71L and 71R and a second switching valve 72.

The first switching valve 71L is connected to the swash-plate switching cylinder 37L at the first travel motor 36L via a fluid passage, and is a two-position switching valve that switches to a first position 71L1 and to a second position 71L2. When the first switching valve 71L is in the first position 71L1, the swash-plate switching cylinder 37L is contracted, and, when the first switching valve 71L is in the second position 71L2, the swash-plate switching cylinder 37L is extended.

The first switching valve 71R is connected to the swash-plate switching cylinder 37R at the second travel motor 36R via a fluid passage, and is a two-position switching valve that switches to a first position 71R1 and to a second position 71R2. When the first switching valve 71R is in the first position 71R1, the swash-plate switching cylinder 37R is contracted, and, when the first switching valve 71R is in the second position 71R2, the swash-plate switching cylinder 37R is extended.

The second switching valve 72 is a solenoid valve that switches the first switching valve 71L and the first switching valve 71R, and is a two-position switching valve that is switchable to a first position 72a and to a second position 72b by energization. The second switching valve 72, the first switching valve 71L, and the first switching valve 71R are connected to each other by a fluid passage 41. When the second switching valve 72 is in the first position 72a, the first switching valve 71L and the first switching valve 71R are switched to the first position 71L1 and the first position 71R1, respectively, and, when the second switching valve 72 is in the second position 72b, the first switching valve 71L and the first switching valve 71R are switched to the second position 71L2 and the second position 71R2, respectively.

That is, when the second switching valve 72 is in the first position 72a, the first switching valve 71L is in the first position 71L1, and the first switching valve 71R is in the first position 71R1, the travel switching valve 34 is brought into the first state and the rotation speeds of the travel motors 36 (the first travel motor 36L and the second travel motor 36R)

are set to the first speed. When the second switching valve 72 is in the second position 72b, the first switching valve 71L is in the second position 71L2, and the first switching valve 71R is in the second position 71R2, the travel switching valve 34 is brought into the second state, and the rotation speeds of the travel motors 36 (the first travel motor 36L and the second travel motor 36R) are set to the second speed.

Therefore, the travel motors 36 (the first travel motor 36L and the second travel motor 36R) can be switched to the first speed, which is the low speed, and to the second speed, which is the high speed, by the travel switching valve 34.

The travel motors 36 can be switched between the first speed and the second speed by a switch (switch 61). The switch 61 is, for example, connected to a controller 60, and gives (outputs) a speed-change instruction of either increasing or decreasing speed in accordance with the operation by, for example, an operator. The switch 61 is switchable to either speed increase of switching from the first speed (the first state) to the second speed (the second state) and speed decrease of switching from the second speed (the second state) to the first speed (the first state). That is, the switch 61 outputs a speed-increase instruction (second-gear instruction) or a speed-decrease instruction (first-gear instruction) to the controller 60.

The controller 60 includes, for example, an electrical electronic circuit and a semiconductor of a CPU, MPU, or the like. The controller 60 switches the travel switching valve 34 on the basis of a switching operation of the switch 61. The switch 61 is a push switch. When the switch 61 is pushed, for example, with the travel motors 36 in the first speed state, the switch 61 outputs the speed-increase instruction to the controller 60. The speed-increase instruction is an instruction that causes the travel motors 36 to be set to the second speed (instruction that causes the travel switching valve 34 to be brought into the second state). When the switch 61 is pushed with the travel motors 36 in the second speed, the switch 61 outputs the speed-decrease instruction to the controller 60. The speed-decrease instruction is an instruction that causes the travel motors 36 to be set to the first speed (instruction that causes the travel switching valve 34 to be brought into the first state). Note that the switch 61 may be a push switch that can be maintained in an ON/OFF state. When the switch 61 is OFF, an instruction of maintaining the travel motors 36 in the first speed is output to the controller 60, and when the switch 61 is ON, an instruction of maintaining the travel motors 36 in the second speed is output to the controller 60.

When the controller 60 obtains the speed-decrease instruction, a solenoid of the second switching valve 72 is deenergized to bring the travel switching valve 34 into the first state. When the controller 60 obtains the speed-increase instruction, the solenoid of the second switching valve 72 is energized to bring the travel switching valve 34 into the second state.

The hydraulic system of the working machine 1 includes a first hydraulic pump P1, a second hydraulic pump P2, and a travel operation device 54. The first hydraulic pump P1 is a pump that is driven by power of the prime mover 32 and includes a constant displacement gear pump. The first hydraulic pump P1 is capable of delivering a hydraulic fluid stored in a tank 22. In particular, the first hydraulic pump P1 delivers a hydraulic fluid primarily used for control. For explanatory convenience, the tank 22 that stores a hydraulic fluid may be called a hydraulic-fluid tank. Of the hydraulic fluid delivered from the first hydraulic pump P1, a hydraulic fluid that is used for control is a pilot fluid, and the pressure of the pilot fluid is a pilot pressure.

The second hydraulic pump P2 is a pump that is driven by power of the prime mover 32 and includes a constant displacement gear pump. The second hydraulic pump P2 is capable of delivering a hydraulic fluid stored in a tank 22, and supplies, for example, a hydraulic fluid to a fluid passage of a working system. For example, the second hydraulic pump P2 supplies a hydraulic fluid to the boom cylinders 14 that operate the booms 10, the bucket cylinders 15 that operate the bucket, and a control valve (flow-rate control valve) that operates and controls an auxiliary hydraulic pressure actuator.

The travel operation device 54 is a device that operates the travel pumps 53 (the first travel pump 53L and the second travel pump 53R), and that is capable of changing the angle of the swash plate (swash-plate angle) of each travel pump 53. The travel operation device 54 includes an operation lever (operation member) 59 and a plurality of operation valves 55.

The operation level 59 is an operation lever that is supported by the operation valves 55 and that swings in a left-right direction (machine-body width direction) or the front-rear direction. That is, with reference to a neutral position N, the operation lever 59 can be operated rightward and leftward from the neutral position N and can be operated forward and rearward from the neutral position N. In other words, the operation lever 59 can be swung in at least four directions with reference to the neutral position N. For explanatory convenience, the forward direction and the rearward direction, that is, the front-rear direction is called a first direction. The rightward direction and the leftward direction, that is, the left-right direction (machine-body width direction) may be called a second direction.

The plurality of operation valves 55 are operated by a common, that is, one operation lever 59. The plurality of operation valves 55 are operated on the basis of the swinging of the operation lever 59. A delivery fluid passage 40 is connected to the plurality of operation valves 55, and a hydraulic fluid (pilot fluid) from the first hydraulic pump P1 can be supplied to the plurality of operation valves 55 via the delivery fluid passage 40. The plurality of operation valves 55 are an operation valve 55A, an operation valve 55B, an operation valve 55C, and an operation valve 55D.

When the operation lever 59 has swung in the forward direction (one direction) in the front-rear direction (first direction) (when the operation lever 59 is operated forward), the operation valve 55A is such that the pressure of hydraulic fluid that is output in accordance with the operation amount of a forward operation (operation) changes. When the operation lever 59 has swung in the rearward direction (the other direction) in the front-rear direction (first direction) (when the operation lever 59 is operated rearward), the operation valve 55B is such that the pressure of hydraulic fluid that is output in accordance with the operation amount of a rearward operation (operation) changes. When the operation lever 59 has swung in the rightward direction (one direction) in the left-right direction (second direction) (when the operation lever 59 is operated rightward), the operation valve 55C is such that the pressure of hydraulic fluid that is output in accordance with the operation amount of the rightward operation (operation) changes. When the operation lever 59 has swung in the leftward direction (the other direction) in the left-right direction (second direction) (when the operation lever 59 is operated leftward), the operation valve 55D is such that the pressure of hydraulic fluid that is output in accordance with the operation amount of the leftward operation (operation) changes.

The plurality of operation valves 55 and the travel pumps 53 (the first travel pump 53L and the second travel pump 53R) are connected to each other by a travel fluid passage 45. In other words, the travel pumps 53 (the first travel pump 53L and the second travel pump 53R) are pieces of hydraulic equipment that can be operated by a hydraulic fluid that has been output from the operation valves 55 (the operation valve 55A, the operation valve 55B, the operation valve 55C, and the operation valve 55D).

The travel fluid passage 45 has a first travel fluid passage 45a, a second travel fluid passage 45b, a third travel fluid passage 45c, a fourth travel fluid passage 45d, and a fifth travel fluid passage 45e. The first travel fluid passage 45a is a fluid passage that is connected to the forward-travel pressure receiver 53a of the first travel pump 53L. The second travel fluid passage 45b is a fluid passage that is connected to the rearward-travel pressure receiver 53b of the first travel pump 53L. The third travel fluid passage 45c is a fluid passage that is connected to the forward-travel pressure receiver 53a of the second travel pump 53R. The fourth travel fluid passage 45d is a fluid passage that is connected to the rearward-travel pressure receiver 53b of the second travel pump 53R. The fifth travel fluid passage 45e is a fluid passage that connects the operation valves 55, the first travel fluid passage 45a, the second travel fluid passage 45b, the third travel fluid passage 45c, and the fourth travel fluid passage 45d.

When the operation lever 59 is swung forward (direction of arrow A1 in FIG. 1), the operation valve 55A is operated to output a pilot pressure from the operation valve 55A. The pilot pressure acts upon the forward-travel pressure receiver 53a of the first travel pump 53L via the first travel fluid passage 45a and acts upon the forward-travel pressure receiver 53a of the second travel pump 53R via the third travel fluid passage 45c. Therefore, the swash-plate angles of the first travel pump 53L and the second travel pump 53R are changed, and the first travel motor 36L and the second travel motor 36R rotate in normal directions (forward rotation) and thus the working machine 1 travels forward in a straight line.

When the operation lever 59 is swung rearward (direction of arrow A2 in FIG. 1), the operation valve 55B is operated to output a pilot pressure from the operation valve 55B. The pilot pressure acts upon the rearward-travel pressure receiver 53b of the first travel pump 53L via the second travel fluid passage 45b and acts upon the rearward-travel pressure receiver 53b of the second travel pump 53R via the fourth travel fluid passage 45d. Therefore, the swash-plate angles of the first travel pump 53L and the second travel pump 53R are changed, and the first travel motor 36L and the second travel motor 36R rotate reversely (rearward rotation) and thus the working machine 1 moves rearward in a straight line.

When the operation lever 59 is swung rightward (direction of arrow A3 in FIG. 1), the operation valve 55C is operated to output a pilot pressure from the operation valve 55C. The pilot pressure acts upon the forward-travel pressure receiver 53a of the first travel pump 53L via the first travel fluid passage 45a and acts upon the rearward-travel pressure receiver 53b of the second travel pump 53R via the fourth travel fluid passage 45d. Therefore, the swash-plate angles of the first travel pump 53L and the second travel pump 53R are changed, and the first travel motor 36L rotates forward and the second travel motor 36R rotates reversely and thus the working machine 1 swings toward the right.

When the operation lever 59 is swung leftward (direction of arrow A4 in FIG. 1), the operation valve 55D is operated to output a pilot pressure from the operation valve 55D. The pilot pressure acts upon the forward-travel pressure receiver 53a of the second travel pump 53R via the third travel fluid passage 45c and acts upon the rearward-travel pressure receiver 53b of the first travel pump 53L via the second travel fluid passage 45b. Therefore, the swash-plate angles of the first travel pump 53L and the second travel pump 53R are changed, and the first travel motor 36L rotates reversely and the second travel motor 36R rotates forward and thus the working machine 1 swings toward the left.

When the operation lever 59 is swung in an oblique direction, a pressure difference between the pilot pressure that acts upon the forward-travel pressure receiver 53a and the pilot pressure that acts upon the rearward-travel pressure receiver 53b causes the rotation directions and the rotation speeds of the first travel motor 36L and the second travel motor 36R to be determined, and the working machine 1 swings rightward or leftward while moving forward or rearward.

That is, when the operation lever 59 is swung obliquely leftward and forward, the working machine 1 swings leftward while moving forward at a speed corresponding to the swing angle of the operation lever 59; when the operation lever 59 is swung obliquely rightward and forward, the working machine 1 swings rightward while moving forward at a speed corresponding to the swing angle of the operation lever 59; when the operation lever 59 is swung obliquely leftward and rearward, the working machine 1 swings leftward while moving rearward at a speed corresponding to the swing angle of the operation lever 59; and, when the operation lever 59 is swung obliquely rightward and rearward, the working machine 1 swings rightward while moving rearward at a speed corresponding to the swing angle of the operation lever 59.

An accelerator 65 that sets the rotation speed of the prime mover is connected to the controller 60. The accelerator 65 is provided near the operator's seat 8. The accelerator 65 is, for example, an accelerator lever that is swingably supported, an accelerator pedal that is swingably supported, an accelerator volume that is rotatably supported, or an accelerator slider that is slidably supported. Note that the accelerator 65 is not limited to the examples above. A rotation detector 66 that detects the rotation speed of the prime mover 32 is connected to the controller 60. The controller 60 determines the actual rotation speed of the prime mover 32 by using the rotation detector 66.

The controller 60 sets a target prime-mover rotation speed (target rotation speed) on the basis of the operation amount of the accelerator 65 to control the actual rotation speed to become the set target rotation speed.

A rotation detection sensor 64 that detects the rotation speeds and the rotation directions of the travel motors 36 (the first travel motor 36L and the second travel motor 36R) is connected to the controller 60. The controller 60 is capable of determining the rotation speeds and the rotation directions of the travel motors 36.

When the travel switching valve 34 is switched from the first state to the second state and when the travel switching valve 34 is switched from the second state to the first state, that is, when the rotation speeds of the travel motors 36 are to be increased from the first speed to the second speed and when the rotation speeds of the travel motors 36 are to be decreased from the second speed to the first speed, the controller 60 performs speed-change shock reduction control in which the supply amount of hydraulic fluid from the travel pumps 53 to the travel motors 36 is decreased by decreasing the rotation speed of the prime mover 32 in accordance with the travel state of the machine body 2.

Note that, when there is a speed-change instruction with the working machine (machine body 2) in a traveling state, the controller 60 decreases the rotation speed of the prime mover 32, whereas, even when there is a speed-change instruction with the working machine (machine body 2) in a stopped state, the controller 60 does not decrease the rotation speed of the prime mover 32.

FIG. 2A illustrates the relationship between the rotation speed (target rotation speed, actual rotation speed) of the prime mover 32 when the speed of a travel motor 36 is increased from the first speed to the second speed, and switching of the travel motor 36.

As shown in FIG. 2A, at a time point Q1, it is assumed that the switch 61 has been operated and the controller 60 has obtained a speed-increase instruction (second-gear instruction) to change from the first state (the first speed) to the second state (the second speed). When the controller 60 obtains a second-gear instruction, the controller 60 decreases an actual rotation speed W1 to a prescribed rotation speed W3 that is lower than a target rotation speed W2 that has been set at the accelerator 65. The prescribed rotation speed W3 is a rotation speed that reduces speed-change shock occurring when the first speed is switched to the second speed, and is, for example, a value obtained by subtracting a decrease amount ΔD1 from the actual rotation speed W1.

The controller 60 sets the decrease amount ΔD1 in accordance with the travel speed of the working machine (machine body) 2 that is one travel state. Specifically, a travel detector 67 that detects the travel speed as a travel state is connected to the controller 60. The travel detector 67 is a device that detects, for example, the pressure (pilot pressure) of hydraulic fluid (pilot fluid) that has been output from the operation valves 55 (the operation valve 55A, the operation valve 55B, the operation valve 55C, and the operation valve 55D), and that converts the detected pilot pressure into travel speed. For example, when the pilot pressure of the travel fluid passage 45 is high, the travel speed is detected as a high value; and, when the pilot pressure is low, the travel speed is detected as a low value. Note that, although the travel detector 67 detects the travel speed from the pilot pressure of the travel fluid passage 45, instead, the travel detector 67 may be a device that detects the rotation speed of rotation shafts of the travel motors 36 and that converts the detected rotation speed into a travel speed, or may be any device that is capable of detecting the travel speed.

That is, when the controller 60 switches to speed increase, the controller 60 sets the decrease amount ΔD1 corresponding to the travel speed detected by the travel detector 67, and decreases the rotation speed of the prime mover in accordance with the set decrease amount ΔD1.

Figure 8B:
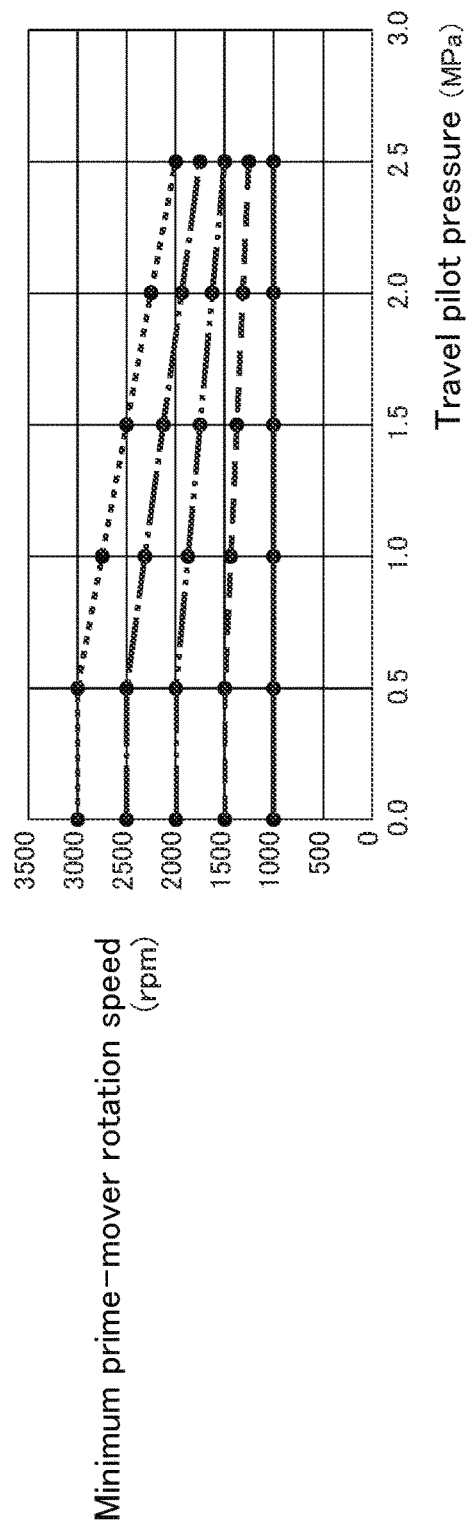
FIG. 8B is a graph of FIG. 8A.

As shown in FIG. 8A, the controller 60 stores decrease-amount calculation data that indicates the relationship between the actual rotation speed W1, the pilot pressure of the travel fluid passage 45 (travel pilot pressure), and the decrease amount ΔD1. FIG. 8B is a graph of FIG. 8A. Note that the decrease-amount calculation data in FIG. 8A and FIG. 8B is only an example and is not limited thereto.

For example, as shown in FIG. 8A, when the controller 60 obtains a second-gear instruction, if the actual rotation speed W1 is 3000 rpm and the travel pilot pressure is 1.5 MPa, the decrease amount ΔD1 is set to 500 rpm. Note that, as shown in FIG. 8A, when the controller 60 decreases the rotation speed of the prime mover, the controller 60 sets a lower limit of the rotation speed of the prime mover so as not to be lower than a minimum rotation speed of the prime mover. In decreasing the rotation speed of the prime mover, even when the decrease amount ΔD1 differs, the controller 60 sets at a constant value a gradient K1 in which the rotation speed of the prime mover is decreased (gradient at a decrease time T1).

As shown in FIG. 2A, when, at a time point Q2, the actual rotation speed W1 reaches the prescribed rotation speed W3, the controller 60 restores the actual rotation speed W1 to the target rotation speed W2. Alternatively, during the decrease time T1 in which the actual rotation speed W1 is decreased to the prescribed rotation speed W3, the controller 60 restores the actual rotation speed W1 to the target rotation speed W2. Here, the controller 60 causes a restoration time T2 in which the actual rotation speed W1 is restored to the target rotation speed W2 from the prescribed rotation speed W3 to be longer than the decrease time T1. That is, the controller 60 causes a decrease speed in which the actual rotation speed W1 is decreased to the prescribed rotation speed W3 to be greater than a restoration speed in which the actual rotation speed W1 is restored from the prescribed rotation speed W3 to the target rotation speed W2.

At a timing in which a predetermined delay period has passed from the time point Q1, that is, at a switching timing (timing during the restoration time T2 in FIG. 2A), the controller 60 outputs a signal to energize a solenoid of the travel switching valve 34 and the travel switching valve (switching valve) 34 is switched from the first state (the first speed) to the second state (the second speed). In other words, the controller 60 switches the travel switching valve 34 to the second state during the restoration time T2.

Figure 3A:
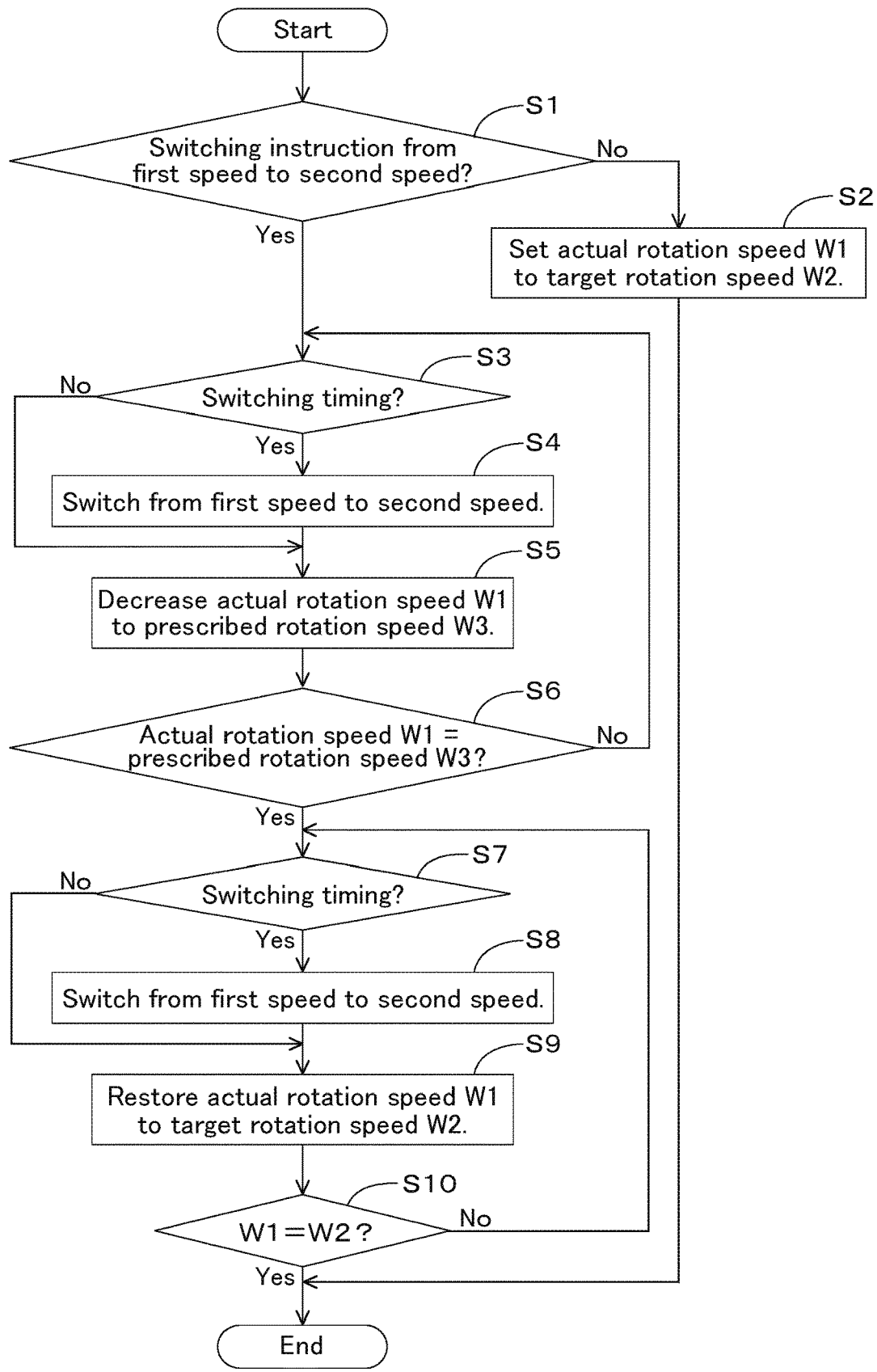
FIG. 3A is a flowchart of a first operation of a controller when the speed of the travel motor is increased.

FIG. 3A is a flowchart of a first operation of the controller 60 when the rotation speed of a travel motor 36 is changed from the first speed to the second speed. Note that the working machine 1 is in a travelling state instead of in a stopped state.

The controller 60 determines whether the switch 61 has been switched from the first speed to the second speed (S1). When the switch 61 has not been switched to the second speed, that is, when the switch 61 is maintained at the first speed (NO in S1), the controller 60 sets the actual rotation speed W1 to the target rotation speed W2 on the basis of the operation of the accelerator 65 (S2). When the switch 61 has been switched from the first speed to the second speed (YES in S1), the controller 60 determines whether a timing is the switching timing in which a predetermined delay period has passed from the time point Q1 (S3). When the timing is not the switching timing (NO in S3), the controller 60 proceeds to S5. On the other hand, when the timing is the switching timing (YES in S3), the controller 60 switches the travel switching valve 34 from the first state (the first speed) to the second state (the second speed) (S4). In the case of NO in S3 or after S4, the controller 60 decreases the actual rotation speed W1 to the prescribed rotation speed W3 that is lower than the target rotation speed W2 (S5).

The controller 60 determines whether the actual rotation speed W1 has reached the prescribed rotation speed W3 (S6), and when the actual rotation speed W1 has not reached the prescribed rotation speed W3 (NO in S6), the controller 60 returns to S3. On the other hand, when the controller 60 determines that the actual rotation speed W1 has reached the prescribed rotation speed W3 (YES in S6), the controller 60 determines whether the timing is the switching timing (S7). When the timing is the switching timing (YES in S7), the controller 60 switches the travel switching valve 34 from the first state (the first speed) to the second state (second speed)

(S8). On the other hand, when the timing is not the switching timing (NO in S7) or after S8, the controller 60 restores the actual rotation speed W1 to the target rotation speed W2 (S9). The controller 60 determines whether the actual rotation speed W1 has been restored to the target rotation speed W2 (S10), and when the controller 60 determines that the actual rotation speed W1 has not been restored (NO in S10), the controller 60 returns to S7. Note that when the controller 60 determines that the actual rotation speed W1 has been restored to the target rotation speed W2 (YES in S10), the process ends.

Figure 2B:
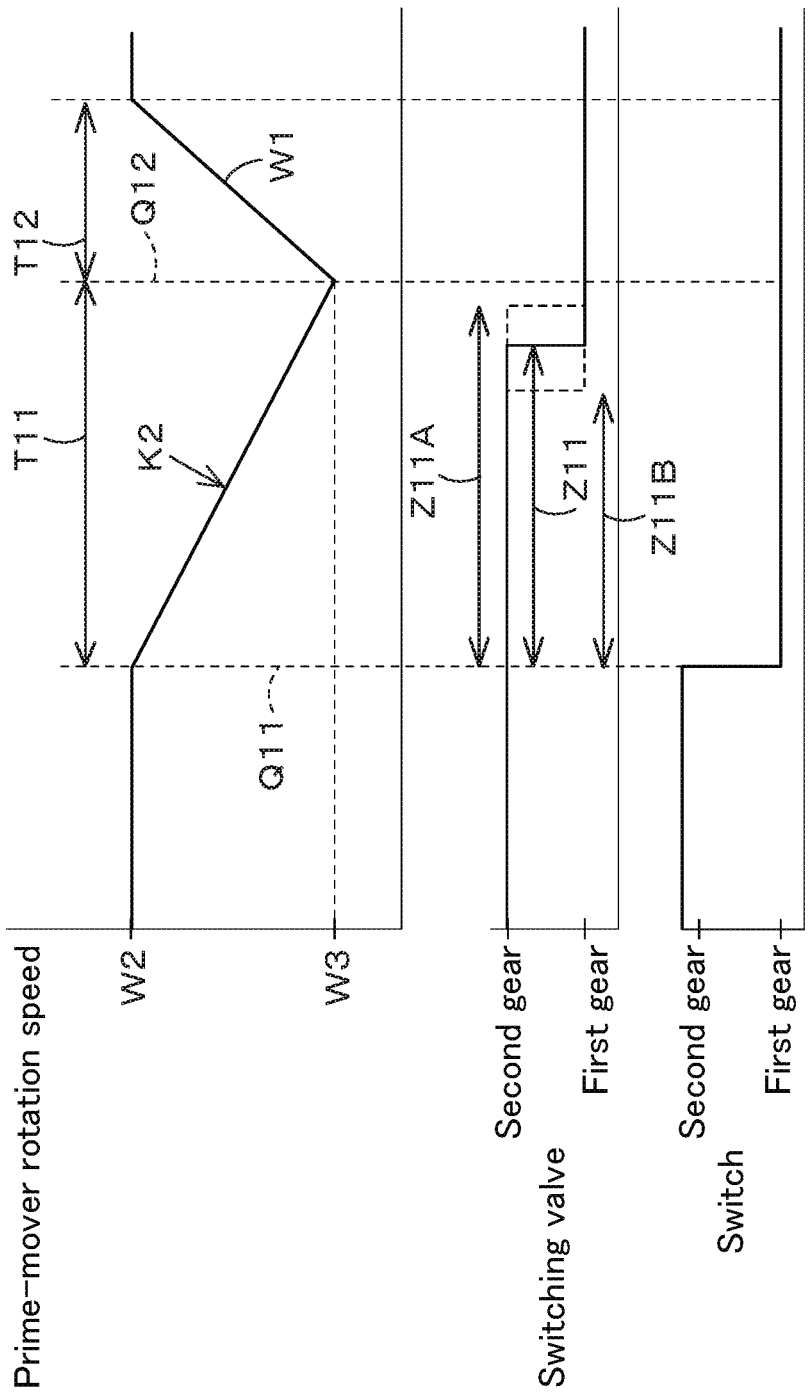
FIG. 2B illustrates the relationship between the rotation speed of the prime mover when the speed of the travel motor is decreased, and the switching of the travel motor.

FIG. 2B illustrates the relationship between the rotation speed (target rotation speed, actual rotation speed) of the prime mover 32 when the speed of a travel motor 36 is decreased from the second speed to the first speed, and switching of the travel motor 36.

As shown in FIG. 2B, at a time point Q11, it is assumed that the switch 61 has been operated and the controller 60 has obtained a speed-decrease instruction (first-gear instruction) to change from the second state (the second speed) to the first state (the first speed). When the controller 60 obtains a first-gear instruction, the controller 60 decreases the actual rotation speed W1 to a prescribed rotation speed W4 that is lower than the target rotation speed W2 that has been set by the accelerator 65. The prescribed rotation speed W4 is a rotation speed at which a speed-change shock occurring when the second speed is switched to the first speed is reduced, and is set, for example, by the decrease amount ΔD1 from the target rotation speed W2. Note that the setting of the decrease amount ΔD1 is the same as that in the embodiment above, and when the controller 60 switches to speed decrease, the controller 60 sets the decrease amount ΔD1 corresponding to the travel speed detected by the travel detector 67, and decreases the rotation speed of the prime mover in accordance with the set decrease amount ΔD1. In decreasing the rotation speed of the prime mover, even when the decrease amount ΔD1 differs, the controller 60 sets at a constant value a gradient K2 in which the rotation speed of the prime mover is decreased (gradient at a decrease time T11).

As shown in FIG. 2B, when, at a time point Q12, the actual rotation speed W1 reaches the prescribed rotation speed W4, the controller 60 restores the actual rotation speed W1 to the target rotation speed W2. Alternatively, during a decrease time T11 in which the actual rotation speed W1 is decreased to the prescribed rotation speed W4, the controller 60 restores the actual rotation speed W1 to the target rotation speed W2. Here, the controller 60 causes a restoration time T12 in which the actual rotation speed W1 is restored to the target rotation speed W2 from the prescribed rotation speed W4 to be shorter than the decrease time T11. That is, the controller 60 causes a decrease speed at which the actual rotation speed W1 is decreased to the prescribed rotation speed W4 to be less than a restoration speed at which the actual rotation speed W1 is restored to the target rotation speed W2 from the prescribed rotation speed W4.

At a switching timing in which a predetermined delay period has passed from the time point Q11 (for example, timing during the decrease time T11), the controller 60 outputs a signal to deenergize the solenoid of the travel switching valve 34 (switching valve) to switch the travel switching valve 34 from the second state (the second speed) to the first state (the first speed). In other words, the controller 60 restores the actual rotation speed W1 to the target rotation speed W2 after switching the travel switching valve 34 to the first state during the decrease time T11.

Figure 3B:
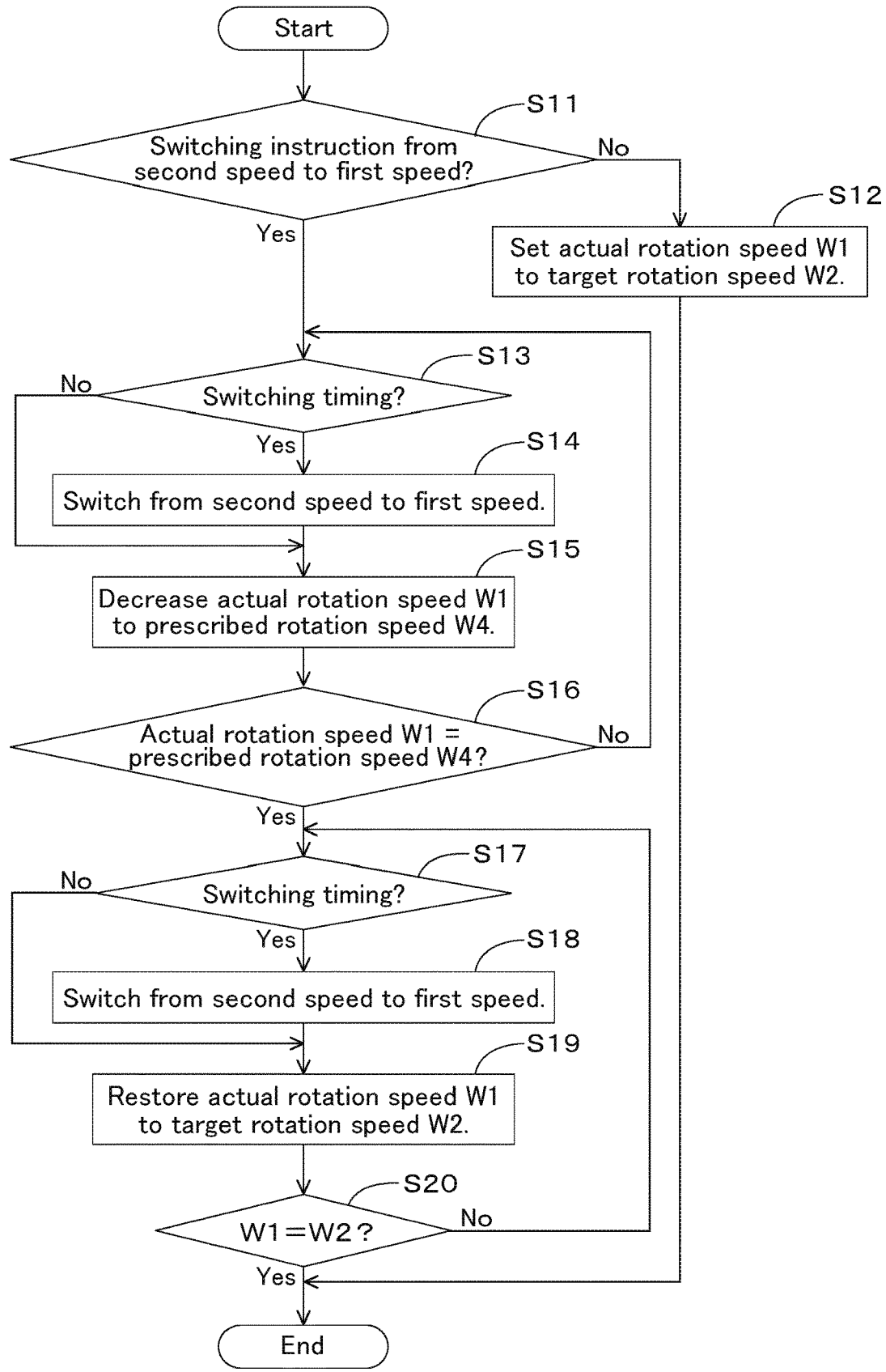
FIG. 3B is a flowchart of a second operation of the controller when the speed of the travel motor is decreased.

FIG. 3B is a flowchart of a second operation of the controller 60 when the rotation speed of a travel motor is changed from the second speed to the first speed. Note that the working machine is in a travelling state instead of in a stopped state.

The controller 60 determines whether the switch 61 has been switched from the second speed to the first speed (S11). When the switch 61 has not switched to the first speed, that is, when the switch 61 is maintained at the second speed (NO in S11), the controller 60 sets the actual rotation speed W1 to the target rotation speed W2 on the basis of the operation of the accelerator 65 (S12). When the switch 61 has been switched from the second speed to the first speed (YES in S11), the controller 60 determines whether a timing is a switching timing (S13). When the timing is not the switching timing (NO in S13), the controller 60 proceeds to S15. On the other hand, when the timing is the switching timing (YES in S13), the controller 60 switches the travel switching valve 34 from the second state (the second speed) to the first state (the first speed) (S14). In the case of NO in S13 or after S14, the controller 60 decreases the actual rotation speed W1 to the prescribed rotation speed W4 that is lower than the target rotation speed W2 (S15). The controller 60 determines whether the actual rotation speed W1 has reached the prescribed rotation speed W4 (S16), and when the actual rotation speed W1 has not reached the prescribed rotation speed W4 (NO in S16), the controller 60 returns to S13. On the other hand, when the controller 60 determines that the actual rotation speed W1 has reached the prescribed rotation speed W4 (YES in S16), the controller 60 determines whether the timing is the switching timing (S17). When the timing is the switching timing (YES in S17), the controller 60 switches the travel switching valve 34 from the second state (the second speed) to the first state (first speed) (S18). On the other hand, when the timing is not the switching timing (NO in S17) or after S18, the controller 60 restores the actual rotation speed W1 to the target rotation speed W2 (S19). The controller 60 determines whether the actual rotation speed W1 has been restored to the target rotation speed W2 (S20), and when the controller 60 determines that the actual rotation speed W1 has not been restored (NO in S20), the controller 60 returns to S17. Note that when the controller 60 determines that the actual rotation speed W1 has been restored to the target rotation speed W2 (YES in S20), the process ends.

A plurality of pressure detectors 80 (travel pressure detectors) are connected to a circulation fluid passage 57h. The plurality of pressure detectors 80 include a first pressure detector 80a and a second pressure detector 80b. A plurality of pressure detectors 80 are connected to a circulation fluid passage 57i. The plurality of pressure detectors 80 include a third pressure detector 80c and a fourth pressure detector 80d. The first pressure detector 80a to the fourth pressure detector 80d are each connected to the controller 60.

Specifically, the first pressure detector 80a is, in the circulation fluid passage 57h, provided on a side of a first port P11 of the first travel motor 36L, and the pressure at the first port P11 is detected as a first travel pressure V1. The second pressure detector 80b is, in the circulation fluid passage 57h, provided on a side of a second port P12 of the first travel motor 36L, and the pressure at the second port P12 is detected as a second travel pressure V2. The third pressure detector 80c is, in the circulation fluid passage 57i, provided on a side of a third port P13 of the second travel motor 36R, and the pressure at the third port P13 is detected as a third travel pressure V3. The fourth pressure detector 80d is, in the circulation fluid passage 57i, provided on a side of a fourth port P14 of the second travel motor 36R, and the pressure at the fourth port P14 is detected as a fourth travel pressure V4.

The first port P11 is a suction port when the first travel motor 36L rotates forward, and the second port P12 is a delivery port when the first travel motor 36L rotates forward. The third port P13 is a suction port when the second travel motor 36R rotates forward, and the fourth port P14 is a delivery port when the second travel motor 36R rotates forward.

When a change in speed has occurred while the machine body 2 (the working machine 1) is moving forward (that is, the first travel motor 36L and the second travel motor 36R are rotating forward), the first travel pressure V1 that is detected at the first pressure detector 80a and the third travel pressure V3 that is detected at the third pressure detector 80c are called forward-travel-directional travel pressures, and the second travel pressure V2 that is detected at the second pressure detector 80b and the fourth travel pressure V4 that is detected at the fourth pressure detector 80d are called rearward-travel-directional travel pressures.

When a change in speed has occurred while the machine body 2 (the working machine 1) is moving rearward (that is, the first travel motor 36L and the second travel motor 36R are rotating reversely), conversely, the first travel pressure V1 that is detected at the first pressure detector 80a and the third travel pressure V3 that is detected at the third pressure detector 80c are called rearward-travel-directional travel pressures, and, conversely, the second travel pressure V2 that is detected at the second pressure detector 80b and the fourth travel pressure V4 that is detected at the fourth pressure detector 80d are called forward-travel-directional travel pressures.

In accordance with the travel pressures detected by the pressure detectors 80 (travel pressure detectors) at the time of a speed-change instruction, the controller 60 changes a delay period lasting up to the switching timing of the travel switching valve 34 from an output timing of the speed-change instruction of the switch (switch 61).

The pressure detectors 80 each detect, as a forward-travel-directional travel pressure, the pressure of hydraulic fluid that is supplied to the travel motors 36 that are rotating forward from the travel pumps 53. Specifically, the first pressure detector 80a detects the first travel pressure V1 as a forward-travel-directional travel pressure, and the third pressure detector 80c detects the third travel pressure V3 as a forward-travel-directional travel pressure. At least one of the first pressure detector 80a and the third pressure detector 80c corresponds to a first travel pressure detector. At the time of a speed-change instruction of increasing or decreasing speed, in accordance with the forward-travel-directional travel pressures (that is, the first travel pressure V1 and the third travel pressure V3) detected by the first pressure detector 80a and the third pressure detector 80c, the controller 60 changes the delay period. In the first embodiment, although, in the controller 60, the higher of the first travel pressure V1 and the third travel pressure V3 is the forward-travel-directional travel pressure, the smaller of the first travel pressure V1 and the third travel pressure V3 may be the forward-travel-directional travel pressure. Alternatively, in the controller 60, both the first travel pressure V1 and the third travel pressure V3 may be the forward-travel-directional travel pressures, or the average value of the first travel pressure V1 and the third travel pressure V3 may be the forward-travel-directional travel pressure.

Specifically, when there has been a second-gear instruction while the machine body 2 is moving forward (forward-travel speed-increase), if the forward-travel-directional travel pressure exceeds a threshold value (for example, a speed-increase first threshold value), the controller 60 decreases the delay period. When there has been a first-gear instruction while the machine body 2 is moving forward (forward-travel speed-decrease), if the forward-travel-directional travel pressure exceeds a threshold value (for example, a speed-decrease second threshold value), the controller 60 decreases the delay period.

The controller 60 includes a memory 60a having a memory table TB (see FIG. 2C). The memory table TB stores threshold values (for example, the speed-increase first threshold value and the speed-decrease second threshold value), central values each indicating a predetermined period from the output timing of the speed-change instruction of the switch 61, first values each indicating a first period that is shorter than the period indicated by the central value, and second values each indicating a second period that is longer than the period indicated by the central value. FIG. 2C illustrates data when the rotation speed of the prime mover 32 is a certain rotation speed RTn (for example, n=1500 to 3000 rpm). When the operation lever 59 is operated for forward travel and the machine body 2 is moving forward and when a speed-increase operation or a speed-decrease operation is performed (that is, there has been the speed-increase instruction (second-gear instruction) or the speed-decrease instruction (first-gear instruction) by the switch 61, the controller 60 determines whether at least one of the forward-travel-directional travel pressures detected by the first pressure detector 80a and the third pressure detector 80c (here, the higher of the first travel pressure V1 and the third travel pressure V3) exceeds the threshold value (for example, the speed-increase first threshold value at the time of speed increase, or the speed-decrease second threshold value at the time of speed decrease). When the controller 60 determines that the threshold value is not exceeded, the controller 60 causes the central value to be the delay period, and when the controller 60 determines that the threshold value is exceeded, the controller 60 causes the first value to be the delay period.

In the case of the forward-travel speed decrease, in addition to the forward-travel-directional travel pressure above being detected, the pressure detectors 80 each detect, as a rearward-travel-directional travel pressure, the pressure of hydraulic fluid that is delivered from the travel motors 36 that are rotating forward to the travel pumps 53. Specifically, the second pressure detector 80b detects the second travel pressure V2 as a rearward-travel-directional travel pressure, and the fourth pressure detector 80d detects the fourth travel pressure V4 as a rearward-travel-directional travel pressure. At least one of the second pressure detector 80b and the fourth pressure detector 80d corresponds to a second travel pressure detector. At the time of a speed-change instruction of decreasing speed, in accordance with the rearward-travel-directional travel pressures (that is, the second travel pressure V2 and the fourth travel pressure V4) detected by the second pressure detector 80b and the fourth pressure detector 80d, the controller 60 changes the delay period. In the first embodiment, although, in the controller 60, the higher of the second travel pressure V2 and the fourth travel pressure V4 is the rearward-travel-directional travel pressure, the smaller of the second travel pressure V2 and the fourth travel pressure V4 may be the rearward-travel-directional travel pressure. Alternatively, in the controller 60, both the second travel pressure V2 and the fourth travel pressure V4 may be the rearward-travel-directional travel pressures, or the average value of the second travel pressure V2 and the fourth travel pressure V4 may be the rearward-travel-directional travel pressure.

Specifically, when there has been a first-gear instruction while the machine body 2 is moving forward (forward-travel speed-decrease), if the forward-travel-directional travel pressure does not exceed the speed-decrease second threshold value, and, if the rearward-travel-directional travel pressure exceeds the speed-decrease second threshold value, the controller 60 increases the delay period. For example, when the operation lever 59 is operated for forward travel and the machine body 2 is moving forward, and when a speed-decrease operation is performed (that is, when there has been the speed-decrease instruction (first-gear instruction) by the switch 61, the controller 60 determines whether at least one of the rearward-travel-directional travel pressures detected by the second pressure detector 80b and the fourth pressure detector 80d (here, the higher of the second travel pressure V2 and the fourth travel pressure V4) exceeds the speed-decrease second threshold value. When the controller 60 determines that the speed-decrease second threshold value is not exceeded, the controller 60 causes the central value to be the delay period, and when the controller 60 determines that the speed-decrease second threshold value is exceeded, the controller 60 causes the second value to be the delay period.

The memory 60a stores the threshold values (the speed-increase first threshold value and the speed-decrease second threshold value), the central values, and the first and second values) according to the rotation speed of the prime mover 32. The controller 60 uses any one of the threshold values, the central values, and the first and second values corresponding to the rotation speed of the prime mover 32 detected by the rotation detector 66. Note that, although the threshold value when the speed-increase operation is performed (speed-increase first threshold value) and the threshold value when the speed-decrease operation is performed (speed-decrease second threshold value) differ from each other, they may be the same.

On the basis of an operation of an operator, the controller 60 is switchable from an ordinary mode to a setting mode of setting a speed-change switching timing, and, when a mode is the setting mode, the controller 60 causes the machine body 2 (working machine 1) to actually travel (to be in an actual travel state) or to idle (to not be in the actual travel state) to change the delay period when the threshold value is exceeded. Note that, in the ordinary mode, when the threshold value is exceeded, the controller 60 may change the delay period. When the delay period is changed in the ordinary mode, the delay period after being changed is used at the time of the next speed-change instruction is used.

Figure 3C:
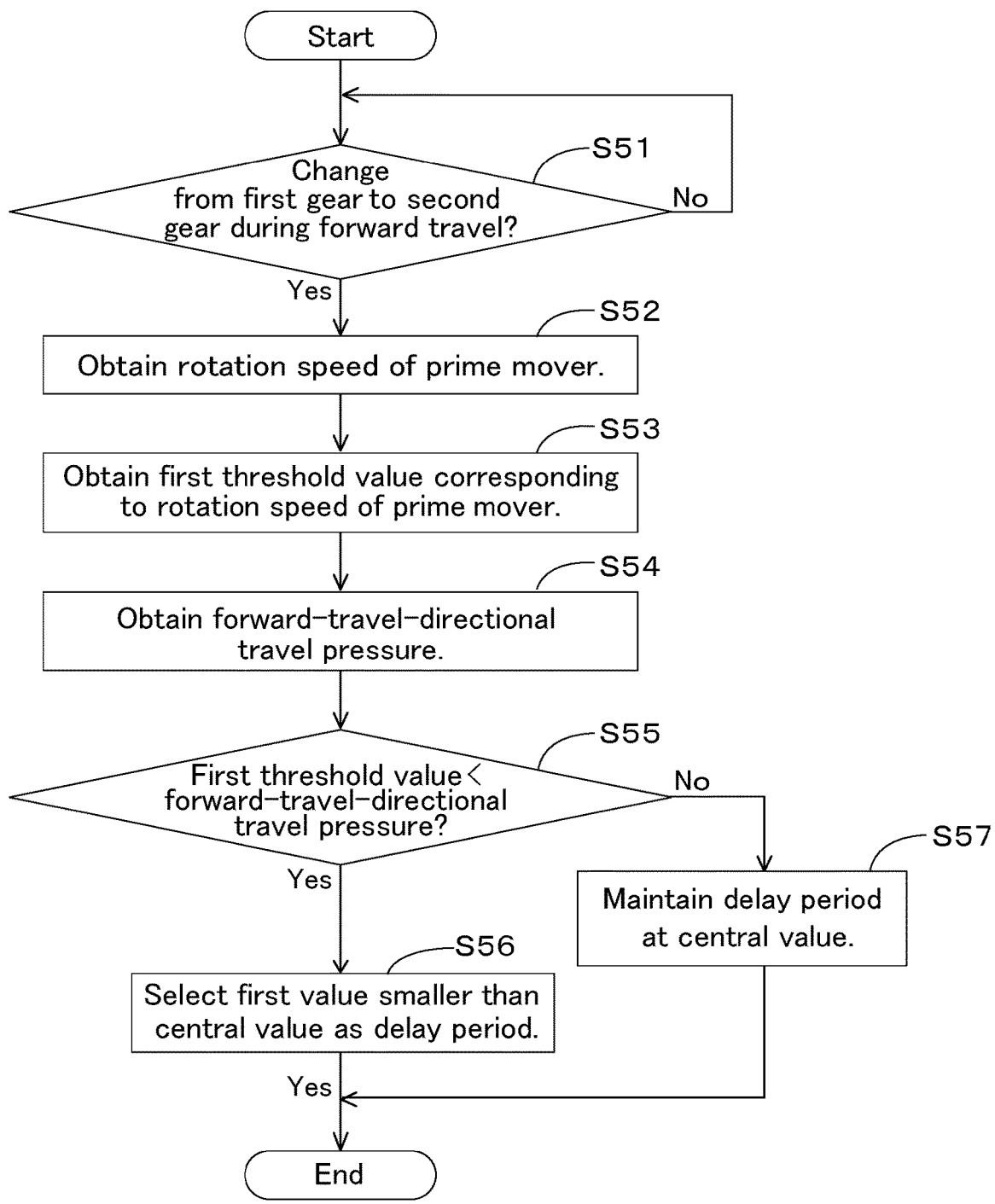
FIG. 3C is a flowchart of an operation of changing a speed-change switching delay period of the controller at the time of a forward-travel speed-increase.

Here, an operation of changing the speed-change switching delay period of the controller 60 at the time of forward-travel speed-increase is described by using FIG. 3C.

When the operation lever 59 is operated for forward travel and the machine body 2 is moving forward (that is, when the rotation directions of the first travel motor 36L and the second travel motor 36R are forward directions as detected by the rotation detection sensor 64), the controller 60 determines whether there is a speed-increase instruction (second-gear instruction) by the switch 61 (S51). When the controller 60 has not received a second-gear instruction (NO in S51), the controller 60 returns to S51 and the controller 60 stands by until the controller 60 receives a second-gear instruction. On the other hand, when the controller 60 has received a second-gear instruction from the switch 61, the controller 60 determines that the speed is to be increased during the forward travel (YES in S51), and obtains the rotation speed of the prime mover 32 by using the rotation detector 66 (S52). The controller 60 obtains from the memory table TB a threshold value corresponding to the rotation speed of the prime mover 32 (speed-increase first threshold value) (S53).

The controller 60 obtains at least one of the forward-travel-directional travel pressures detected by the first pressure detector 80a and the third pressure detector 80c (here, the higher of the first travel pressure V1 and the third travel pressure V3) (S54). The controller 60 determines whether the forward-travel-directional travel pressure (here, the higher of the first travel pressure V1 and the third travel pressure V3) exceeds the threshold value (for example, the speed-increase first threshold value) (S55). When the forward-travel-directional travel pressure exceeds the speed-increase first threshold value (YES in S55), the controller 60 selects, as a delay period, the first value that is smaller than the central value (S56). That is, as shown in FIG. 2C and FIG. 2D, the controller 60 changes the delay period from the central value (60 milliseconds) to the first value (40 milliseconds). As shown in FIG. 2A, a delay period Z10 when the delay period has been the central value (60 milliseconds) is changed to a delay period Z10A that is shorter than the delay period Z10.

On the other hand, when the forward-travel-directional travel pressure does not exceed the speed-increase first threshold value (NO in S55), as shown in FIG. 2C and FIG. 2D, the controller 60 maintains the delay period at the central value (60 milliseconds) (S57). As shown in FIG. 2A, the delay period Z10 is maintained at the central value (60 milliseconds).

Figure 3D:
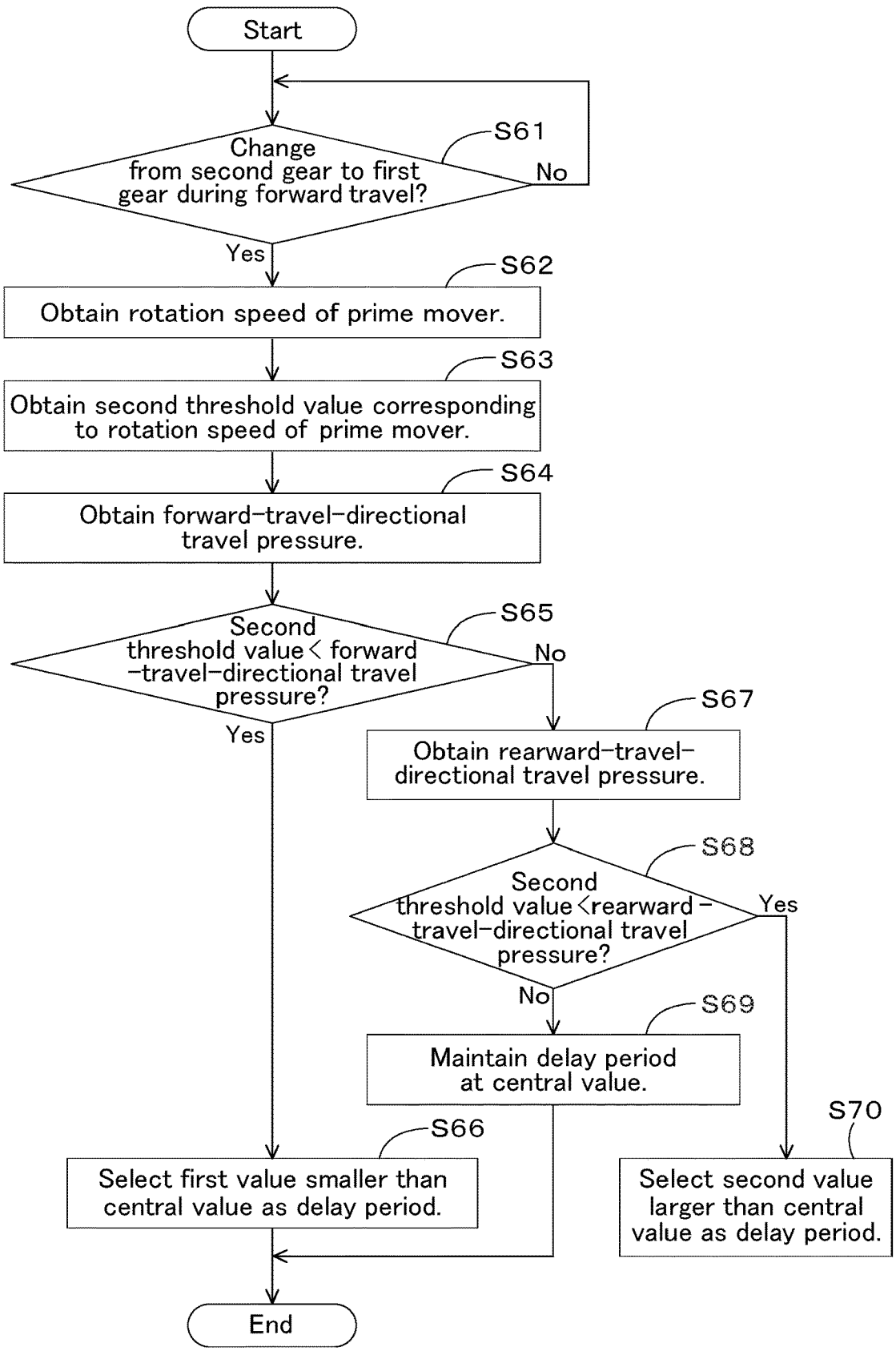
FIG. 3D is a flowchart of an operation of changing the speed-change switching delay period of the controller at the time of a forward-travel speed-decrease.

Next, an operation of changing the speed-change switching delay period of the controller 60 at the time of forward-travel speed-decrease is described by using FIG. 3D.

When the operation lever 59 is operated for forward travel and the machine body 2 is moving forward (that is, when the rotation directions of the first travel motor 36L and the second travel motor 36R detected by the rotation detection sensor 64 are forward directions), the controller 60 determines whether there has been a speed-decrease instruction (first-gear instruction) by the switch 61 (S61). When the controller 60 has not received a first-gear instruction (NO in S61), the controller 60 returns to S61 and the controller 60 stands by until the controller 60 receives a first-gear instruction. On the other hand, when the controller 60 has received a first-gear instruction from the switch 61, the controller 60 determines that the speed is to be decreased during the forward travel (YES in S61), and obtains the rotation speed of the prime mover 32 by using the rotation detector 66 (S62). The controller 60 obtains from the memory table TB a threshold value corresponding to the rotation speed of the prime mover 32 (speed-decrease second threshold value) (S63).

The controller 60 obtains at least one of the forward-travel-directional travel pressures detected by the first pressure detector 80a and the third pressure detector 80c (here, the higher of the first travel pressure V1 and the third travel pressure V3) (S64). The controller 60 determines whether the forward-travel-directional travel pressure (here, the higher of the first travel pressure V1 and the third travel pressure V3) exceeds the threshold value (for example, the speed-decrease second threshold value) (S65). When the forward-travel-directional travel pressure exceeds the speed-decrease second threshold value (YES in S65), the controller 60 selects, as a delay period, the first value that is smaller than the central value (S66). That is, as shown in FIG. 2C and FIG. 2D, the controller 60 changes the delay period from the central value (680 milliseconds) to the first value (660 milliseconds). As shown in FIG. 2B, a delay period Z11 that has been the central value (680 milliseconds) is changed to a delay period Z11B that is shorter than the delay period Z11.

On the other hand, when the forward-travel-directional travel pressure does not exceed the speed-decrease second threshold value (NO in S65), the controller 60 obtains at least one of the rear-movement travel pressures detected by the second pressure detector 80b and the fourth pressure detector 80d (here, the higher of the second travel pressure V2 and the fourth travel pressure V4) (S67). The controller 60 determines whether the rear-movement travel pressure (here, the higher of the second travel pressure V2 and the fourth travel pressure V4) exceeds a threshold value (for example, the speed-decrease second threshold value) (S68). When the rear-movement travel pressure does not exceed the speed-decrease second threshold value (NO in S68), the controller 60 maintains the delay period at the central value (680 milliseconds) (S69). As shown in FIG. 2B, the delay period Z11 is maintained at the central value (680 milliseconds).

On the other hand, when the rearward-travel-directional travel pressure exceeds the speed-decrease second threshold value (YES in S68), the controller 60 selects, as a delay period, the second value that is larger than the central value (S70). That is, as shown in FIG. 2C and FIG. 2D, the controller 60 changes the delay period from the central value (680 milliseconds) to the second value (700 milliseconds). As shown in FIG. 2B, a delay period Z11 that has been the central value (680 milliseconds) is changed to a delay period Z11A that is longer than the delay period Z11.

The working machine 1 of the first embodiment above includes a prime mover 32, travel pumps 53 that are operated by power of the prime mover 32 and that deliver a hydraulic fluid, travel motors 36 that are rotatable by the hydraulic fluid delivered by the travel pumps 53, a machine body 2 where the prime mover 32, the travel pumps 53, and the travel motors 36 are provided, a travel switching valve 34 that is switchable to the first state in which the rotation speed of the travel motors 36 can be increased up to the first maximum speed and to the second state in which the rotation speed of the travel motors 36 can be increased up to the second maximum speed that is greater than the first maximum speed, a travel operation device 54 that has operation valves that are capable of changing the pressure of the hydraulic fluid that acts upon the travel pumps 53 in accordance with the operation of an operation lever 59 (operation member), a controller 60 that decreases a supply amount of the hydraulic fluid from the travel pumps 53 to the travel motors 36 on the basis of the travel state of the machine body 2 when performing either one of the speed-increase operation of switching from the first state to the second state and the speed-decrease operation of switching from the second state to the first state, a switch 61 (switching unit) that gives a speed-change instruction of either increasing or decreasing speed, and pressure detectors 80 (travel pressure detectors) that detect, as a travel pressure, the pressure of the hydraulic fluid that the travel pumps 53 deliver to the travel motors 36 at the time of a speed-change instruction. In accordance with the travel pressure detected by the pressure detectors 80 at the time of the speed-change instruction, the controller 60 changes a delay period lasting up to a switching timing of the travel switching valve 34 from an output timing of the speed-change instruction of the switch 61.

According to this structure, in accordance with the travel pressure at the time of the speed-change instruction, the controller 60 changes the delay period lasting up to the switching timing of the travel switching valve 34 from the output timing of the speed-change instruction of the switch 61. Therefore, with regard to the working machine 1 in which there is a shift in the speed-change timing resulting from variations in a delay in responding to the rotation of hydraulic equipment or the prime mover 32, an adjustment of reducing a speed-change shock can be performed.

The pressure detectors 80 include first travel pressure detectors (first pressure detector 80a and third pressure detector 80c) that detect, as forward-travel-directional travel pressures, the pressure of hydraulic fluid that is supplied to the travel motors 36 that are rotating forward from the travel pumps 53. In accordance with the forward-travel-directional travel pressures (first travel pressure V1 and third travel pressure V3) detected by the first pressure detector 80a and the third pressure detector 80c at the time of a speed-change instruction of increasing or decreasing speed, the controller 60 changes the delay period. In this structure, in accordance with the forward-travel-directional travel pressures when the working machine 1 moves forward and a speed-increase operation or a speed-decrease operation is performed, the controller 60 changes the delay period lasting up to the switching timing of the travel switching valve 34 from the output timing of the speed-change instruction of increasing or decreasing speed at the time of the forward travel. Therefore, with regard to the working machine 1 in which there is a shift in the speed-change timing resulting from variations in a delay in responding to the rotation of hydraulic equipment or the prime mover 32, an adjustment of reducing a speed-change shock occurring when the speed is increased or decreased at the time of the forward travel of the working machine 1 can be performed.

When the forward-travel-directional travel pressures (the first travel pressure V1 and the third travel pressure V3) detected by the first travel pressure detectors (the first pressure detector 80a and the third pressure detector 80c) at the time of a speed-change instruction of increasing speed exceed a threshold value, the controller 60 decreases the delay period. According to this structure, when the forward-travel-directional travel pressures when the working machine 1 moves forward and a speed-increase operation is performed exceed the threshold value, the controller 60 decreases the delay period lasting up to the switching timing of the travel switching valve 34 from the output timing of the speed-change instruction of increasing speed at the time of the forward travel. Therefore, with regard to the working machine 1 in which there is a shift in the speed-change timing resulting from variations in a delay in responding to the rotation of hydraulic equipment or the prime mover 32, a speed-change shock occurring when the speed is increased at the time of the forward travel of the working machine 1 can be reduced.

When the forward-travel-directional travel pressures (the first travel pressure V1 and the third travel pressure V3) detected by the first travel pressure detectors (the first pressure detector 80a and the third pressure detector 80c) at the time of a speed-change instruction of decreasing speed exceed a threshold value, the controller 60 decreases the delay period. According to this structure, when the forward-travel-directional travel pressures when the working machine 1 moves forward and when the speed is decreased exceed the threshold value, the controller 60 decreases the delay period lasting up to the switching timing of the travel switching valve 34 from the output timing of the speed-change instruction of decreasing speed at the time of the forward travel. Therefore, with regard to the working machine 1 in which there is a shift in the speed-change timing resulting from variations in a delay in responding to the rotation of hydraulic equipment or the prime mover 32, a speed-change shock occurring when the speed is decreased at the time of the forward travel of the working machine 1 can be reduced.

The pressure detectors 80 include second travel pressure detectors (second pressure detector 80b and fourth pressure detector 80d) that detect, as rearward-travel-directional travel pressures, the pressure of hydraulic fluid that is delivered from the travel motors 36 that are rotating forward to the travel pumps 53. When the rearward-travel-directional travel pressures (second travel pressure V2 and fourth travel pressure V4) detected by the second pressure detector 80b and the fourth pressure detector 80d at the time of a speed-change instruction of decreasing speed exceed a threshold value, the controller 60 increases the delay period. According to this structure, when the rearward-travel-directional travel pressures when the working machine 1 moves forward and the speed is decreased exceed the threshold value, the controller 60 increases the delay period lasting up to the switching timing of the travel switching valve 34 from the output timing of a speed-change instruction of decreasing speed at the time of the forward travel. Therefore, with regard to the working machine 1 in which there is a shift in the speed-change timing resulting from variations in a delay in responding to the rotation of hydraulic equipment or the prime mover 32, a speed-change shock occurring when the speed is decreased at the time of the forward travel of the working machine 1 can be suitably reduced.

When the controller 60 is in the setting mode of setting a speed-change switching timing, the controller 60 changes the delay period. According to this structure, when the controller 60 is in the setting mode of setting a speed-change switching timing, an adjustment of reducing a speed-change shock can be performed.

The controller 60 includes a memory 60a having a memory table TB that stores at least threshold values, central values each indicating a predetermined period from the output timing of the speed-change instruction of the switch 61, and first values each indicating a first period that is shorter than the period indicated by the central value. When the operation lever 59 is operated for forward travel and when a speed-increase operation or a speed-decrease operation is performed, the controller 60 determines whether the forward-travel-directional travel pressures (the first travel pressure V1 and the third travel pressure V3) detected by the first travel pressure detectors (the first pressure detector 80a and the third pressure detector 80c) exceed the threshold value. When the controller 60 determines that the threshold value is not exceeded, the controller 60 causes the central value to be the delay period, and when the controller 60 determines that the threshold value is exceeded, the controller 60 causes the first value to be the delay period. According to this structure, when the controller 60 determines that the forward-travel-directional travel pressures when the working machine 1 moves forward and a speed-increase operation or a speed-decrease operation is performed exceed the threshold value, the controller 60 changes the delay period lasting up to the switching timing of the travel switching valve 34 from the output timing of the speed-change instruction of increasing or decreasing speed at the time of the forward travel to the first value that is a period shorter than the period indicated by the central value. Therefore, with regard to the working machine 1 in which there is a shift in the speed-change timing resulting from variations in a delay in responding to the rotation of hydraulic equipment or the prime mover 32, a speed-change shock occurring when the speed is increased or decreased at the time of the forward travel of the working machine 1 can be suitably reduced by changing the delay period to the first value that is smaller than the central value when the speed-change shock is insufficiently reduced when the central value is used.

The controller 60 includes the memory 60a having the memory table TB that stores at least threshold values, central values each indicating a predetermined period from the output timing of the speed-change instruction of the switch 61, and second values each indicating a second period that is longer than the period indicated by the central value. When the operation lever 59 is operated for forward travel and when the speed is decreased, the controller 60 determines whether the rearward-travel-directional travel pressures (the second travel pressure V2 and the fourth travel pressure V4) detected by the second travel pressure detectors (the second pressure detector 80b and the fourth pressure detector 80d) exceed the threshold value. When the controller 60 determines that the threshold value is not exceeded, the controller 60 causes the central value to be the delay period, and when the controller 60 determines that the threshold value is exceeded, the controller 60 changes the central value and causes the second value to be the delay period. According to this structure, when the controller 60 determines that the rearward-travel-directional travel pressures when the working machine 1 moves forward and the speed is decreased exceed the threshold value, the controller 60 changes, as the delay period, the period lasting up to the switching timing of the travel switching valve 34 from the output timing of the speed-change instruction of decreasing speed at the time of the forward travel to the second value that is a period longer than the period indicated by the central value. Therefore, with regard to the working machine 1 in which there is a shift in the speed-change timing resulting from variations in a delay in responding to the rotation of hydraulic equipment or the prime mover 32, a speed-change shock occurring when the speed is decreased at the time of the forward travel can be suitably reduced by changing the delay period to the second value that is larger than the central value when the speed-change shock is insufficiently reduced when the central value is used.

A rotation detector 66 that detects the rotation speed of the prime mover 32 is provided. The memory 60a stores the threshold values, the central values, and the first values according to the rotation speed of the prime mover 32, and the controller 60 uses any one of the threshold values, the central values, and the first values corresponding to the rotation speed of the prime mover 32 detected by the rotation detector 66. According to this structure, since the memory 60a stores the threshold values, the central values, and the first values according to the rotation speed of the prime mover 32, a speed-change shock can be suitably reduced in correspondence with the rotation speed of the prime mover 32.

The rotation detector 66 that detects the rotation speed of the prime mover 32 is provided. The memory 60a stores the threshold values, the central values, and the second values according to the rotation speed of the prime mover 32, and the controller 60 uses any one of the threshold values, the central values, and the second values corresponding to the rotation speed of the prime mover 32 detected by the rotation detector 66. According to this structure, since the memory 60a stores the threshold values, the central values, and the second values according to the rotation speed of the prime mover 32, a speed-change shock can be suitably reduced in correspondence with the rotation speed of the prime mover 32.

The threshold value when a speed-increase operation is performed (the speed-increase first threshold value) and the threshold value when a speed-decrease operation is performed (the speed-decrease second threshold value) differ from each other. According to this structure, since a threshold value that differs when the speed-increase operation is performed from when the speed-decrease operation is performed is used, the delay period can be suitably set when the speed-increase operation is performed and when the speed-decrease operation is performed.

In the Case of Speed-Change during Rearward Travel

Although, in the first embodiment, the case in which there has been a speed-change instruction during the forward travel of the machine body 2 is described, even in the case in which there has been a speed-change instruction during rearward travel of the machine body 2, the delay period can be changed in the same way. In S51 shown in FIG. 3C and in S61 shown in FIG. 3D, when the operation lever 59 is operated rearward and the machine body 2 is moving rearward (that is, the rotation directions of the first travel motor 36L and the second travel motor 36R are reverse directions as detected by the rotation detection sensor 64), the controller 60 determines whether there has been a speed-increase instruction (second-gear instruction) by the switch 61 (S51), and determines whether there has been a speed-decrease instruction (first-gear instruction) by the switch 61 (S61). Further, the pressures (the first travel pressure V1 and the third travel pressure V3) detected by the first travel pressure detectors (the first pressure detector 80a and the third pressure detector 80c) are detected with the pressures of hydraulic fluid that is supplied from the travel pumps 53 to the travel motors 36 that rotate reversely serving as rearward-travel-directional travel pressures. That is, during the rearward travel, the pressures (the first travel pressure V1 and the third travel pressure V3) that are detected by the first pressure detector 80a and the third pressure detector 80c become rearward-travel-directional travel pressures instead of forward-travel-directional travel pressures, and the pressures (the second travel pressure V2 and the fourth travel pressure V4) detected by the second pressure detector 80b and the fourth pressure detector 80d become forward-travel-directional travel pressures instead of rearward-travel-directional travel pressures. According to this structure, in accordance with the rearward-travel-directional travel pressures when the working machine 1 moves rearward and a speed-increase operation or a speed-decrease operation is performed, the controller 60 changes the delay period lasting up to the switching timing of the travel switching valve 34 from the output timing of the speed-change instruction of increasing or decreasing speed at the time of rearward travel. Therefore, with regard to the working machine 1 in which there is a shift in the speed-change timing resulting from variations in a delay in responding to the rotation of hydraulic equipment or the prime mover 32, a speed-change shock occurring when the speed is increased or the speed is decreased at the time of the rearward travel of the working machine 1 can be adjusted.

In a user switching mode in which a user sets a speed-change switching timing, when the operation lever 59 (operation member) is operated rearward and when the speed is decreased, the controller 60 determines whether the rearward-travel-directional travel pressures detected by the first travel pressure detectors exceed a threshold value, and when the controller 60 determines that the threshold value is not exceeded, the controller 60 causes the central value to be the delay period, and when the controller 60 determines that the threshold value is exceeded, the controller 60 may cause the first value to be the delay period in place of the central value. According to this structure, in the user switching mode in which a user sets a speed-change switching timing, when the controller 60 determines that the travel pressures when the working machine 1 moves rearward and the speed is decreased exceed the threshold value, the controller 60 changes, as the delay period, the period lasting up to the switching timing of the travel switching valve 34 from the output timing of the speed-change instruction of decreasing speed at the time of the rearward travel to the first value that is a period shorter than the period indicated by the central value. Therefore, in the user switching mode, with regard to the working machine 1 in which there is a shift in the speed-change timing resulting from variations in a delay in responding to the rotation of hydraulic equipment or the prime mover 32, a speed-change shock occurring when the working machine 1 moves rearward can be suitably reduced by changing the delay period to the first value that is smaller than the central value when the speed-change shock is insufficiently reduced when the central value is used.

When the speed is increased, the controller 60 causes the restoration time T2 in which the rotation speed of the prime mover is restored to be longer than the decrease time T1 in which the rotation speed of the prime mover is decreased, and when the speed is decreased, the controller 60 causes the restoration time T12 to be shorter than the decrease time T11. According to this structure, after a speed-change shock has been reduced, the speed-change shock can be made as small as possible when the rotation speed of the prime mover is to be restored as soon as possible before a speed change.

Note that, although, in FIG. 2C and FIG. 2D, there is only one value for the first value when the speed is increased (for example, 40 milliseconds) and for the second value when the speed is increased (for example, 80 milliseconds) and there is only one value for the first value when the speed is decreased (for example, 660 milliseconds) and for the second value when the speed is decreased (for example, 700 milliseconds), the number of values is not limited thereto. For example, the number of first values when the speed is increased may be a plurality of values, such as 50 milliseconds, 40 milliseconds, and 30 milliseconds, and the number of second values when the speed is increased may be a plurality of values, such as 70 milliseconds, 80 milliseconds, and 90 milliseconds; and, until the travel pressures detected by the pressure detectors 80 no longer exceed the threshold value, the controller 60 may select the first value in a gradually decreasing order, and may select the second value in a gradually increasing order. The number of first values when the speed is decreased (for example, 660 milliseconds) and the number of second values when the speed is decreased (for example, 700 milliseconds) may each be a plurality of values. For example, the number of first values when the speed is decreased may be a plurality of values, such as 670 milliseconds, 660 milliseconds, and 650 milliseconds, and the number of second values when the speed is decreased may be a plurality of values, such as 690 milliseconds, 700 milliseconds, and 710 milliseconds; and, until the travel pressures detected by the pressure detectors 80 no longer exceed the threshold value, the controller 60 may select the first value in a gradually decreasing order, and may select the second value in a gradually increasing order.

Second Embodiment

A second embodiment differs from the first embodiment in that a controller 60 changes a delay period in accordance with a difference between a forward-travel-directional travel pressure and a rearward-travel-directional travel pressure.

When a machine body 2 is moving forward and there has been a speed-change instruction of increasing speed of decreasing speed, the controller 60 changes a delay period in accordance with a difference between forward-travel-directional travel pressures (first travel pressure V1 and third travel pressure V3) detected by first travel pressure detectors (first pressure detector 80*a* and third pressure detector 80*c*) and rearward-travel-directional travel pressures (second travel pressure V2 and fourth travel pressure V4) detected by second travel pressure detectors (second pressure detector 80*b* and fourth pressure detector 80*d*).

Specifically, in the case of forward-travel speed-increase or forward-travel speed-decrease, when the difference is a positive value and the absolute value of the difference exceeds a determination value, the controller 60 decreases the delay period. In the case of the forward-travel speed-decrease, when the difference is a negative value and the absolute value of the difference exceeds a determination value, the controller 60 increases the delay period. In the second embodiment, a memory table TB stores determination values, central values each indicating a predetermined period from an output timing of a speed-change instruction of a switch 61, first values each indicating a first period that is shorter than the period indicated by the central value, and second values each indicating a second period that is longer than the period indicated by the central value.

Figure 3E:
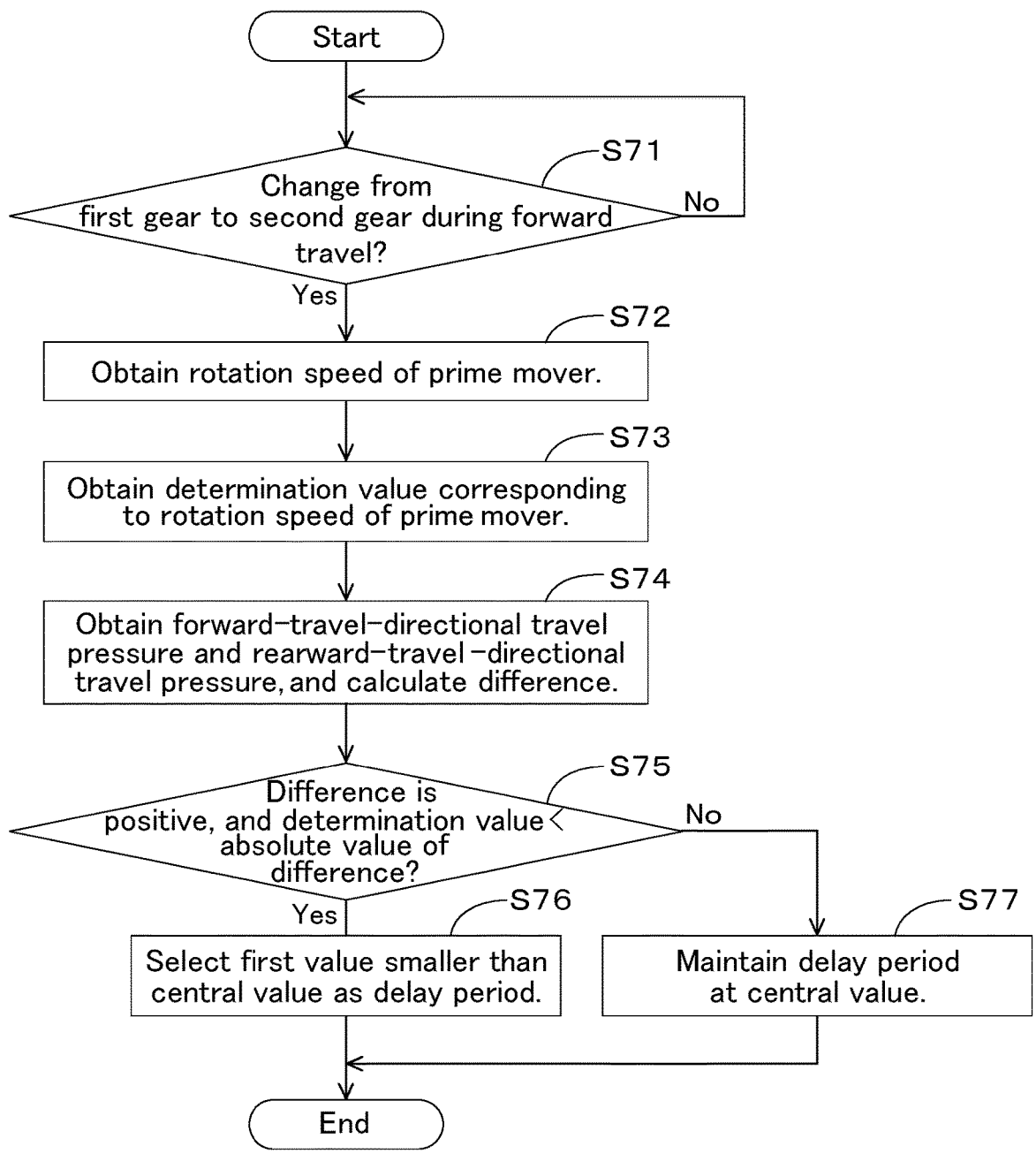
FIG. 3E is a flowchart of an operation of changing a speed-change switching delay period of a controller at the time of a forward-travel speed-increase in a second embodiment.

Here, an operation of changing a speed-change switching delay period of the controller 60 at the time of forward-travel speed-increase in the second embodiment is described by using FIG. 3E.

When an operation lever 59 is operated for forward travel and the machine body 2 is moving forward (that is, when the rotation directions of a first travel motor 36L and a second travel motor 36R are forward directions as detected by a rotation detection sensor 64), the controller 60 determines whether there has been a speed-increase instruction (second-gear instruction) by the switch 61 (S71). When the controller 60 has not received a second-gear instruction (NO in S71), the controller 60 returns to S71 and the controller 60 stands by until the controller 60 receives a second-gear instruction. On the other hand, when the controller 60 has received a second-gear instruction from the switch 61, the controller 60 determines that the speed is to be increased during the forward travel (YES in S71), and obtains the rotation speed of a prime mover 32 by using a rotation detector 66 (S72). The controller 60 obtains from the memory table TB a determination value corresponding to the rotation speed of the prime mover 32 (S73).

The controller 60 obtains at least one of the forward-travel-directional travel pressures detected by the first pressure detector 80*a* and the third pressure detector 80*c* (here, the higher of the first travel pressure V1 and the third travel pressure V3) and at least one of the rearward-travel-directional travel pressures detected by the second pressure detector 80*b* and the fourth pressure detector 80*d* (here, the higher of the second travel pressure V2 and the fourth travel pressure V4) and calculates the difference (S74). The controller 60 determines whether the difference is positive and the absolute value of the difference exceeds a determination value (S75). When the difference is positive and the absolute value of the difference exceeds the determination value (YES in S75), the controller 60 selects the first value that is smaller than the central value as the delay period (S76). For example, as shown in FIG. 2C and FIG. 2D, the controller 60 changes the delay period from the central value (60 milliseconds) to the first value (40 milliseconds). On the other hand, when the difference is positive and the absolute value of the difference does not exceed the determination value (NO in S75), the controller 60 maintains the delay period at the central value (60 milliseconds) (S77).

Figure 3F:
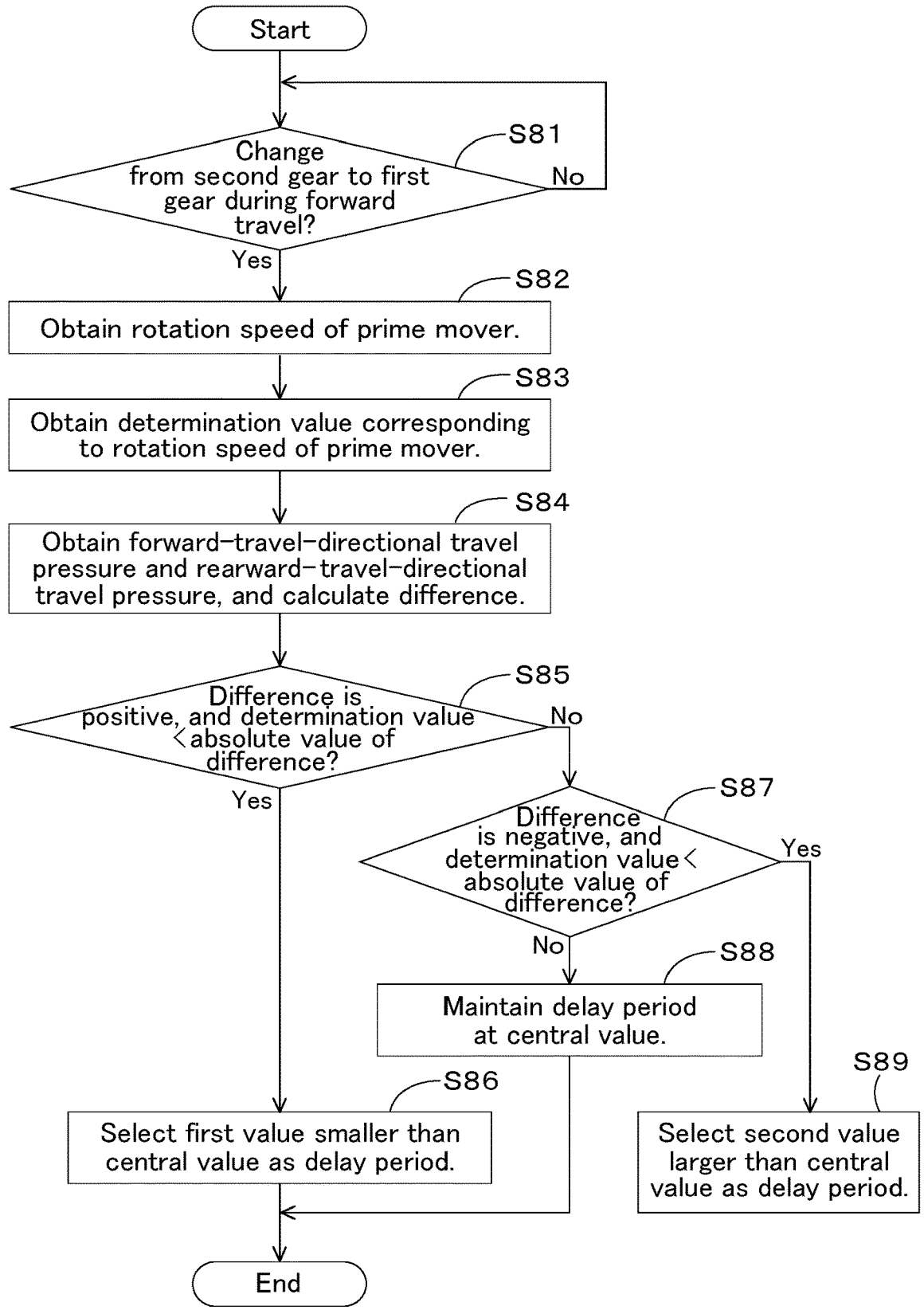
FIG. 3F is a flowchart of an operation of changing the speed-change switching delay period of the controller at the time of a forward-travel speed-decrease in the second embodiment.

Next, an operation of changing a speed-change switching delay period of the controller 60 at the time of forward-travel speed-decrease in the second embodiment is described by using FIG. 3F.

When the operation lever 59 is operated for forward travel and the machine body 2 is moving forward (that is, when the rotation directions of the first travel motor 36L and the second travel motor 36R are forward directions as detected by the rotation detection sensor 64), the controller 60 determines whether there has been a speed-decrease instruction (first-gear instruction) by the switch 61 (S81). When the controller 60 has not received a first-gear instruction (NO in S81), the controller 60 returns to S81 and the controller 60 stands by until the controller 60 receives a first-gear instruction. On the other hand, when the controller 60 has received a first-gear instruction from the switch 61, the controller 60 determines that the speed is to be decreased during the forward travel (YES in S81), and obtains the rotation speed of the prime mover 32 by using the rotation detector 66 (S82). The controller 60 obtains from the memory table TB a determination value corresponding to the rotation speed of the prime mover 32 (S83).

The controller 60 obtains at least one of the forward-travel-directional travel pressures detected by the first pressure detector 80*a* and the third pressure detector 80*c* (here, the higher of the first travel pressure V1 and the third travel pressure V3) and at least one of the rearward-travel-directional travel pressures detected by the second pressure detector 80*b* and the fourth pressure detector 80*d* (here, the higher of the second travel pressure V2 and the fourth travel pressure V4), and calculates the difference (S84). The controller 60 determines whether the difference is positive and the absolute value of the difference exceeds a determination value (S85). When the difference is positive and the absolute value of the difference exceeds the determination value (YES in S85), the controller 60 selects the first value that is smaller than the central value as the delay period (S86). For example, as shown in FIG. 2C and FIG. 2D, the controller 60 changes the delay period from the central value (680 milliseconds) to the first value (660 milliseconds). As shown in FIG. 2B, the delay period Z11 that has been the central value (680 milliseconds) is changed to the delay period Z11B that is shorter than the delay period Z11.

On the other hand, when the difference is negative or when the difference is positive and the absolute value of the difference does not exceed the determination value (NO in S85), the controller 60 determines whether the difference is negative and the absolute value of the difference exceeds the determination value (S87). When the difference is negative and the absolute value of the difference does not exceed the determination value, or when the difference is positive and the absolute value of the difference does not exceed the determination value (NO in S87), the controller 60 maintains the delay period at the central value (680 milliseconds) (S89). As shown in FIG. 2B, the delay period Z11 is maintained at the central value (680 milliseconds).

On the other hand, when the difference is negative and the absolute value of the difference exceeds the determination value (YES in S87), the controller 60 selects the second value that is larger than the central value as the delay period (S70). That is, as shown in FIG. 2C and FIG. 2D, the controller 60 changes the delay period from the central value (680 milliseconds) to the second value (700 milliseconds). As shown in FIG. 2B, the delay period Z11 that has been the central value (680 milliseconds) is changed to the delay period Z11A that is longer than the delay period Z11.

In a working machine 1 of the second embodiment above, in accordance with a difference between a forward-travel-directional travel pressure and a rearward-travel-directional travel pressure when the working machine 1 moves forward and a speed-increase operation or a speed-decrease operation is performed, the controller 60 changes a delay period lasting up to a switching timing of a travel switching valve 34 from an output timing of a speed-change instruction of increasing speed or decreasing speed at the time of the forward travel. Therefore, with regard to the working machine 1 in which there is a shift in the speed-change timing resulting from variations in a delay in responding to the rotation of hydraulic equipment or the prime mover 32, an adjustment of reducing a speed-change shock occurring when the speed is increased or decreased at the time of the forward travel of the working machine 1 can be performed.

When a difference between a forward-travel-directional travel pressure and a rearward-travel-directional travel pressure when the working machine 1 moves forward and a speed-increase operation is performed is a positive value and the absolute value of the difference exceeds a determination value, the controller 60 decreases the delay period lasting up to the switching timing of the travel switching valve 34 from the output timing of the speed-change instruction of increasing speed at the time of the forward travel. Therefore, with regard to the working machine 1 in which there is a shift in the speed-change timing resulting from variations in a delay in responding to the rotation of hydraulic equipment or the prime mover 32, a speed-change shock occurring when the speed is increased at the time of the forward travel of the working machine 1 can be suitably reduced.

When a difference between a forward-travel-directional travel pressure and a rearward-travel-directional travel pressure when the working machine 1 moves forward and the speed is decreased is a positive value and the absolute value of the difference exceeds a determination value, the controller 60 decreases the delay period lasting up to the switching timing of the travel switching valve 34 from the output timing of the speed-change instruction of decreasing speed at the time of the forward travel. Therefore, with regard to the working machine 1 in which there is a shift in the speed-change timing resulting from variations in a delay in responding to the rotation of hydraulic equipment or the prime mover 32, a speed-change shock occurring when the speed is decreased at the time of the forward travel of the working machine 1 can be suitably reduced.

When a difference between a forward-travel-directional travel pressure and a rearward-travel-directional travel pressure when the working machine 1 moves forward and the speed is decreased is a negative value and the absolute value of the difference exceeds a determination value, the controller 60 increases the delay period lasting up to the switching timing of the travel switching valve 34 from the output timing of the speed-change instruction of decreasing speed at the time of the forward travel. Therefore, with regard to the working machine 1 in which there is a shift in the speed-change timing resulting from variations in a delay in responding to the rotation of hydraulic equipment or the prime mover 32, a speed-change shock occurring when the speed is decreased at the time of the forward travel of the working machine 1 can be suitably reduced.

Third Embodiment

Figure 6:
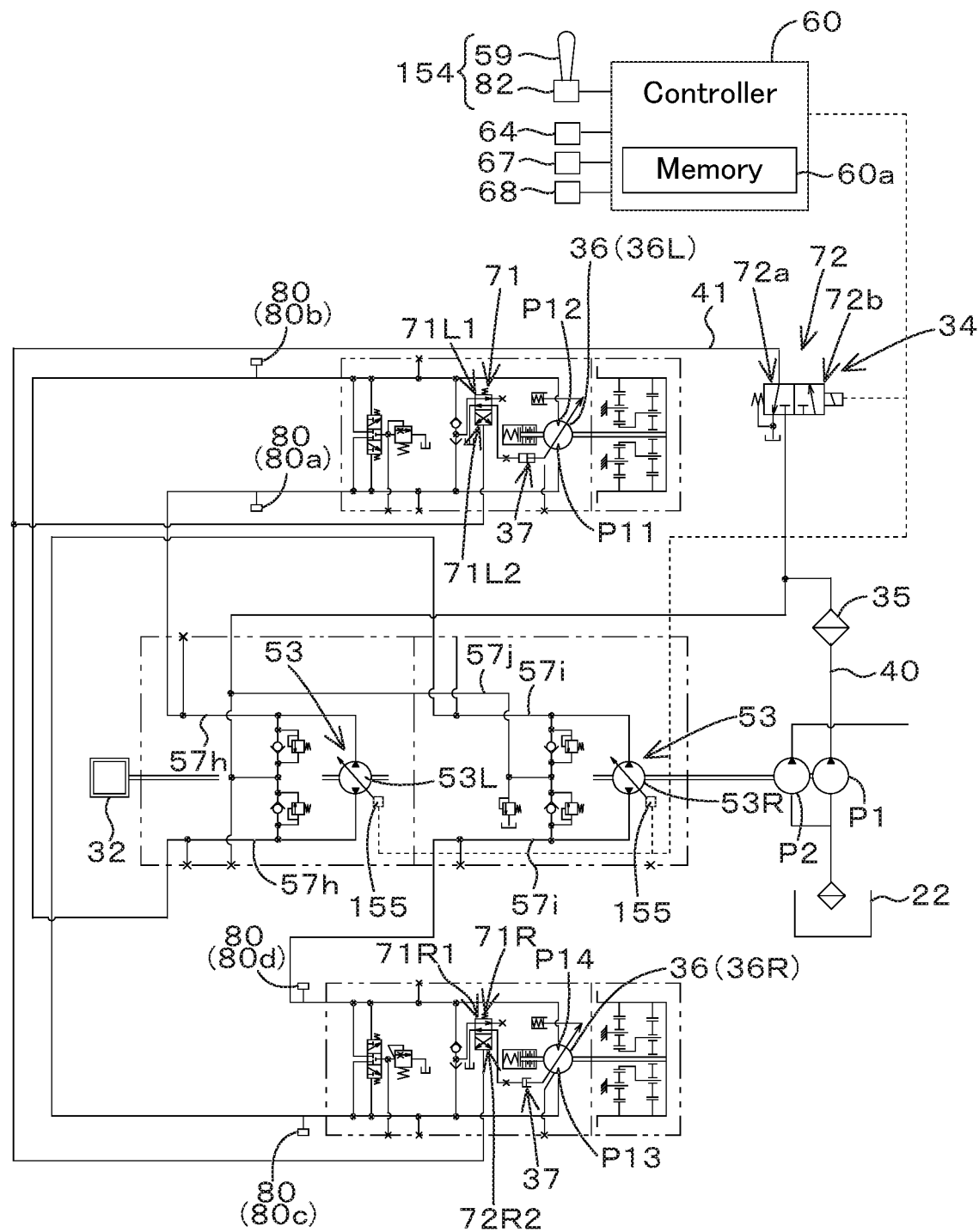
FIG. 6 illustrates a hydraulic system (hydraulic circuit) of a working machine in a third embodiment.

FIG. 6 illustrates a hydraulic system of a working machine 1 according to a third embodiment. In the third embodiment, not only can an operation device 154 change the swash-plate angles of travel pumps 53 (first travel pump 53L and second travel pump 53R), but also a controller 60 is capable of changing the swash-plate angles of the travel pumps 53. Note that although FIG. 6 illustrates the travel pumps 53 (the first travel pump 53L and the second travel pump 53R), the operation device 154, and the controller 60, the other portions are the same as those in FIG. 1.

The operation device 154 is a joystick device that changes the swash-plate angles of the travel pumps 53 by electricity, and has an operation lever 59 and an operation detector (sensor 82) that converts, for example, the operation amount and the operation direction of the operation lever 59 into an electrical signal. When the operation lever 59 is operated rightward, leftward, forward, or rearward, the operation detector 82 detects the operation amount and the operation direction, and the detected operation amount and the detected operation direction are input to the controller 60. The controller 60 changes the swash-plate angles of the travel pumps 53 on the basis of the operation amount and the operation direction detected by the operation detector 82. Specifically, the travel pumps 53 (the first travel pump 53L and the second travel pump 53R) each have a regulator 155 that changes the swash-plate angle, and the controller 60 controls the regulators 155 to change the swash-plate angles. With regard to the travel pumps 53 (the first travel pump 53L and the second travel pump 53R), as the swash-plate angle increases, the flow rate of hydraulic fluid that is delivered is increased, and, as the swash-plate angle decreases, the flow rate of hydraulic fluid that is delivered is decreased. An angle detector 68 that detects a swash-plate angle is connected to the controller 60. The angle detector 68 allows the controller 60 to determine the actual swash-plate angles of the travel pumps 53.

When a travel switching valve 34 switches from the first state to the second state (when the rotation speeds of the travel motors 36 are increased from the first speed to the second speed), the controller 60 decreases the swash-plate angles of the travel pumps 53 (the first travel pump 53L and the second travel pump 53R).

Figure 4A:
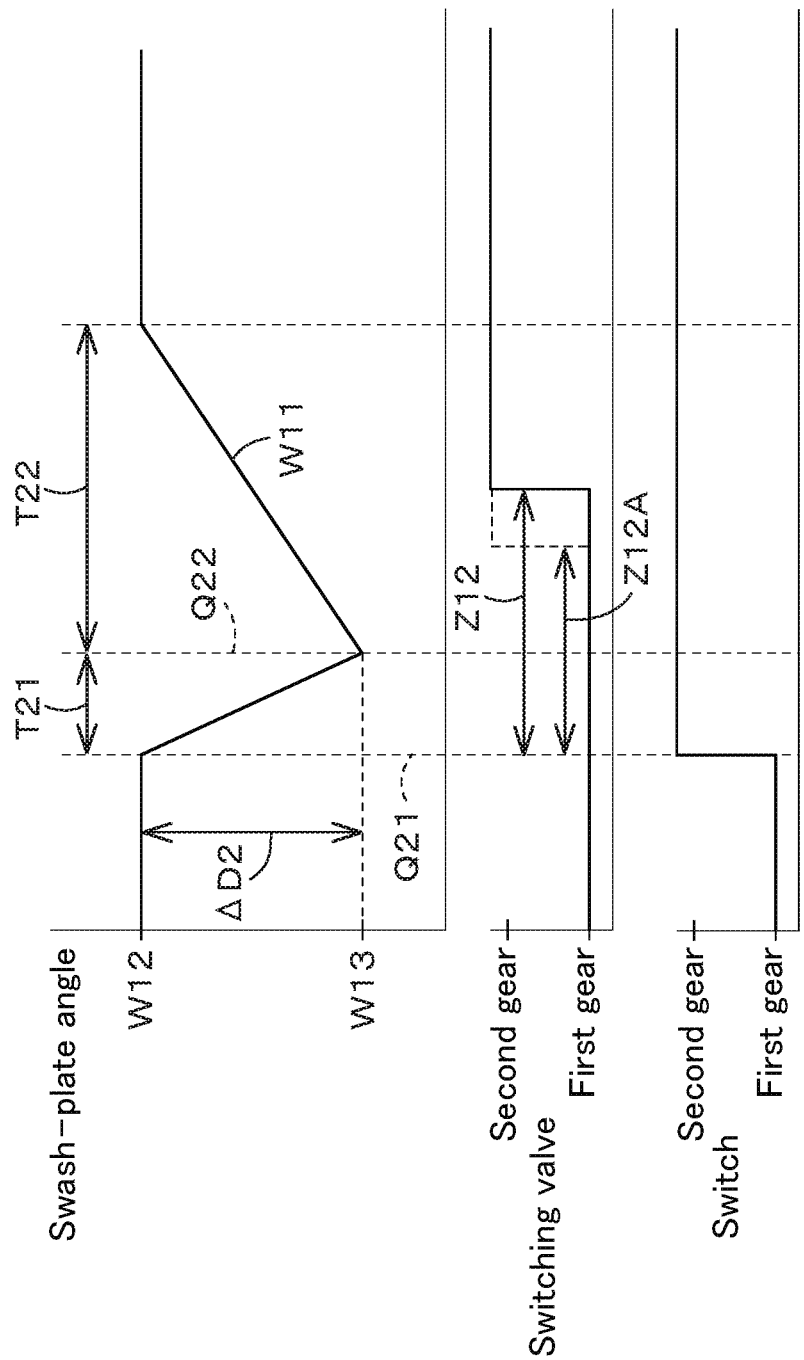
FIG. 4A illustrates the relationship between a swash-plate angle of a travel pump when the speed of a travel motor is increased, and switching of the travel motor.

FIG. 4A illustrates the relationship between a swash-plate angle (target angle, actual angle) when the speed of a travel motor is increased from the first speed to the second speed, and switching of the travel motor.

As shown in FIG. 4A, at a time point Q21, it is assumed that a switch (switching valve) 61 has been operated and the controller 60 has obtained a speed-increase instruction (second-gear instruction) to change from the first state (first speed) to the second state (second speed). When the controller 60 obtains a second-gear instruction, the controller 60 decreases an actual angle W11 of each travel pump 53 (the first travel pump 53L and the second travel pump 53R) to a prescribed angle W13 that is smaller than a swash-angle target angle (target angle) W12 that has been set on the basis of the operation amount of the operation device 154. The prescribed angle W13 is an angle at which a speed-change shock occurring when the speed has been switched from the first speed to the second speed is reduced, and is a value obtained by subtracting a decrease amount ΔD2 from the actual angle W11.

As shown in FIG. 9A, the controller 60 stores decrease-amount calculation data that indicates the relationship between the travel pilot pressure and a decrease amount of the travel pilot pressure (the decrease amount ΔD2). FIG. 9B is a graph of FIG. 9A. The decrease-amount calculation data in FIG. 9A and FIG. 9B is only an example and is not limited thereto. The travel speeds (vehicle speeds) shown in FIG. 9A are values shown for explanatory convenience, and are prescribed prime-mover rotation speeds and are not limited thereto.

Although FIG. 9A and FIG. 9B show the decrease amount of the travel pilot pressure, there is a correlation between the decrease amount of the travel pilot pressure and the swash-plate angle decrease amount ΔD2. That is, since the structure is one that manipulates the swash-plate angle by the travel pilot pressure, the higher the travel pilot pressure is, the larger the swash-plate angle is, and the lower the travel pilot pressure is, the smaller the swash-plate angle is.

For example, as shown in FIG. 9A, when the controller 60 obtains a second-gear instruction and the travel speed is 5.0 km/h (travel pilot pressure: 1.5 MPa), the controller 60 sets the decrease amount of the travel pilot pressure to 0.50 MPa. Note that, as shown in FIG. 9A, when the rotation speed of the prime mover is decreased, the controller 60 sets a lower limit of the swash-plate angle (the travel pilot pressure) so that the swash-plate angle, that is, the travel pilot pressure does not become lower than the minimum pilot pressure.

When, at a time point Q22, the actual angle W11 reaches the prescribed angle W13, the controller 60 restores the actual angle W11 to the target angle W12. Alternatively, during a decrease time T21 in which the actual angle W11 is decreased to the prescribed angle W13, the controller 60 restores the actual angle W11 to the target angle W12. Here, the controller 60 causes a restoration time T22 in which the actual angle W11 is restored to the target angle W12 from the prescribed angle W13 to be longer than the decrease time T21. That is, the controller 60 causes a decrease speed at which the actual angle W11 is decreased to the prescribed angle W13 to be greater than a restoration speed at which the actual angle W11 is restored from the prescribed angle W13 to the target angle W12.

At a predetermined switching timing from the time point Q21 (a timing in the restoration time T22 in FIG. 4A), the controller 60 outputs a signal that energizes a solenoid of the travel switching valve 34 and switches the travel switching valve (switching valve) 34 from the first state (the first speed) to the second state (the second speed). In other words, the controller 60, after switching the travel switching valve 34 to the second state in the restoration time T22, restores the actual angle W11 to the target angle W12.

Figure 5A:
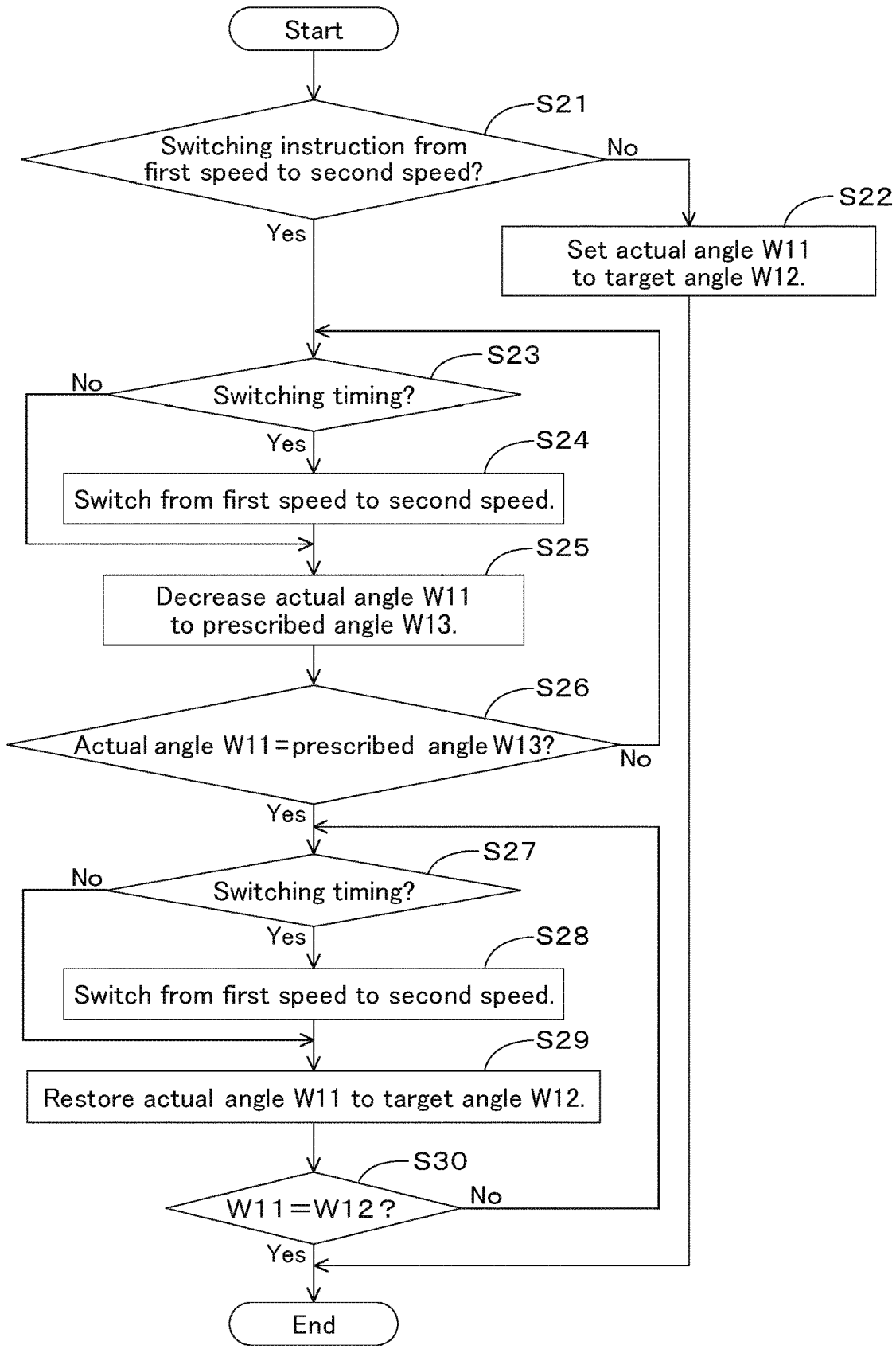
FIG. 5A is a flowchart of a third operation of a controller when the speed of a travel motor is increased.

FIG. 5A is a flowchart of a third operation of the controller 60 when the rotation speed of a travel motor is changed from the first speed to the second speed in the third embodiment. Note that the working machine 1 is in a travelling state instead of in a stopped state.

The controller 60 determines whether the switch 61 has been switched from the first speed to the second speed (S21). When the switch 61 has not been switched to the second speed, that is, when the switch 61 is maintained at the first speed (NO in S21), the controller 60 sets the actual angle W11 to the target angle W12 on the basis of the operation of the operation device 154 (S22). When the switch 61 has been switched from the first speed to the second speed (YES in S21), the controller 60 determines whether a timing is the predetermined switching timing from the time point Q21 (S23). When the timing is not the switching timing (NO in S23), the controller 60 proceeds to S25. On the other hand, when the timing is the switching timing (YES in S23), the controller 60 switches the travel switching valve 34 from the first state (the first speed) to the second state (the second speed) (S24). In the case of NO in S23 or after S24, the controller 60 decreases the actual angle W11 to the prescribed angle W13 that is smaller than the target angle W12 (S25).

The controller 60 determines whether the actual angle W11 has reached the prescribed angle W13 (S26), and when the actual angle W1 has not reached the prescribed angle W13 (NO in S26), the controller 60 returns to S23. On the other hand, when the controller 60 determines that the actual angle W11 has reached the prescribed angle W13 (YES in S26), the controller 60 determines whether a timing is the switching timing (S27). When the timing is the switching timing (YES in S27), the controller 60 switches the travel switching valve 34 from the first state (the first speed) to the second state (second speed) (S28). On the other hand, when the timing is not the switching timing (NO in S27) or after S28, the controller 60 restores the actual angle W11 to the target angle W12 (S29). The controller 60 determines whether the actual angle W11 has been restored to the target angle W12 (S30), and when the controller 60 determines that the actual angle W11 has not been restored (NO in S30), the controller 60 returns to S27. Note that when the controller 60 determines that the actual angle W11 has been restored to the target angle W12 (YES in S30), the process ends.

Figure 4B:
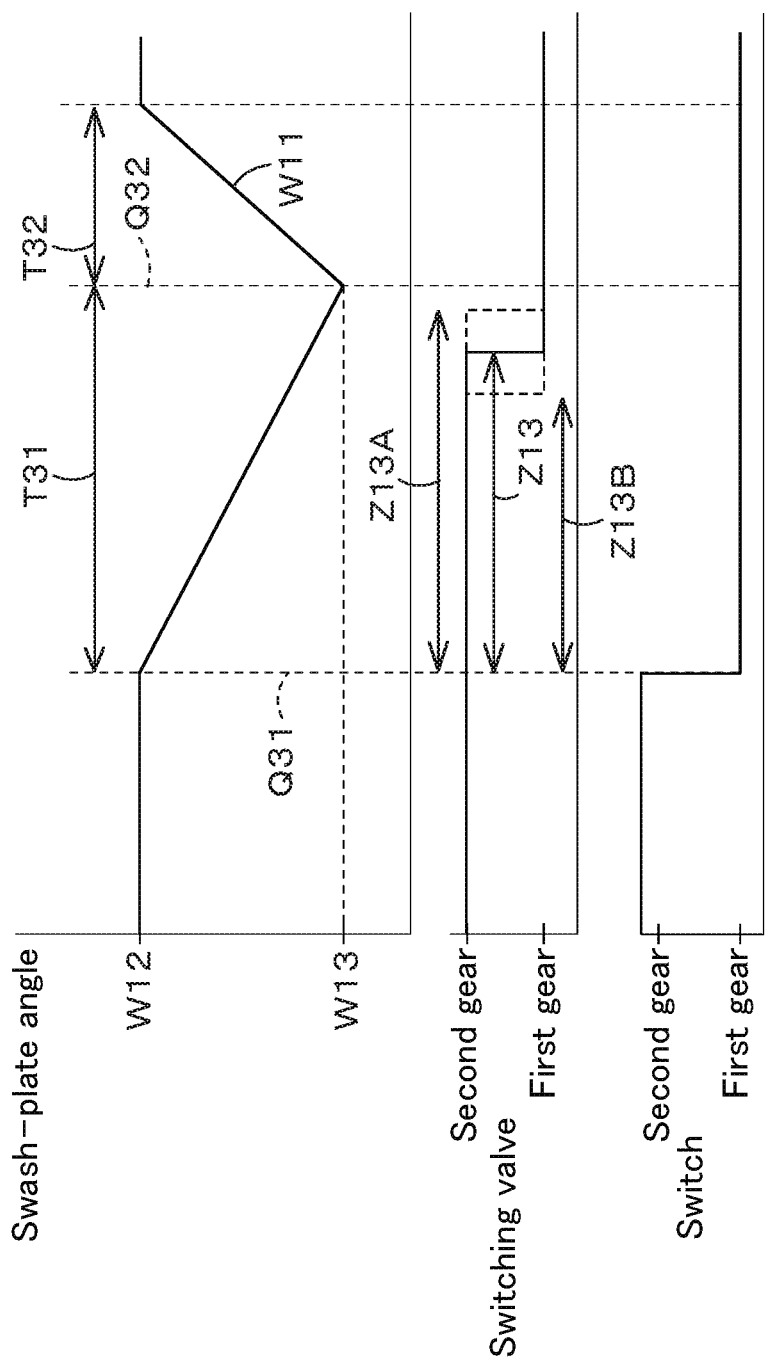
FIG. 4B illustrates the relationship between the swash-plate angle of the travel pump when the speed of the travel motor is decreased, and the switching of the travel motor.

FIG. 4B illustrates the relationship between a swash-plate angle (target angle, actual angle) when the speed of a travel motor is decreased from the second speed to the first speed, and switching of the travel motor.

As shown in FIG. 4B, at a time point Q31, it is assumed that the switch 61 has been operated and the controller 60 has obtained a speed-decrease instruction (first-gear instruction) to change from the second state (second speed) to the first state (first speed). When the controller 60 obtains a first-gear instruction, the controller 60 decreases the actual angle W11 of the travel pumps 53 (the first travel pump 53L and the second travel pump 53R) to a prescribed angle W13 that is smaller than the swash-plate-angle target angle W12 that has been set on the basis of the operation amount of the operation device 154.

When, at a time point Q32, the actual angle W11 reaches the prescribed angle W13, the controller 60 restores the actual angle W11 to the target angle W12. Alternatively, during a decrease time T31 in which the actual angle W11 is decreased to the prescribed angle W13, the controller 60 restores the actual angle W11 to the target angle W12. Here, the controller 60 causes a restoration time T32 in which the actual angle W11 is restored to the target angle W12 from the prescribed angle W13 to be shorter than the decrease time T31. That is, the controller 60 causes a decrease speed at which the actual angle W11 is decreased to the prescribed angle W13 to be less than a restoration speed at which the actual angle W11 is restored to the target angle W12 from the prescribed angle W13.

At a predetermined switching timing from the time point Q31 (for example, a timing in the decrease time T31), the controller 60 outputs a signal that deenergizes the solenoid of the travel switching valve 34 and switches the travel switching valve 34 from the second state (the second speed) to the first state (the first speed). In other words, the controller 60 restores the actual angle W11 to the target angle W12 during the decrease time T31.

Figure 5B:
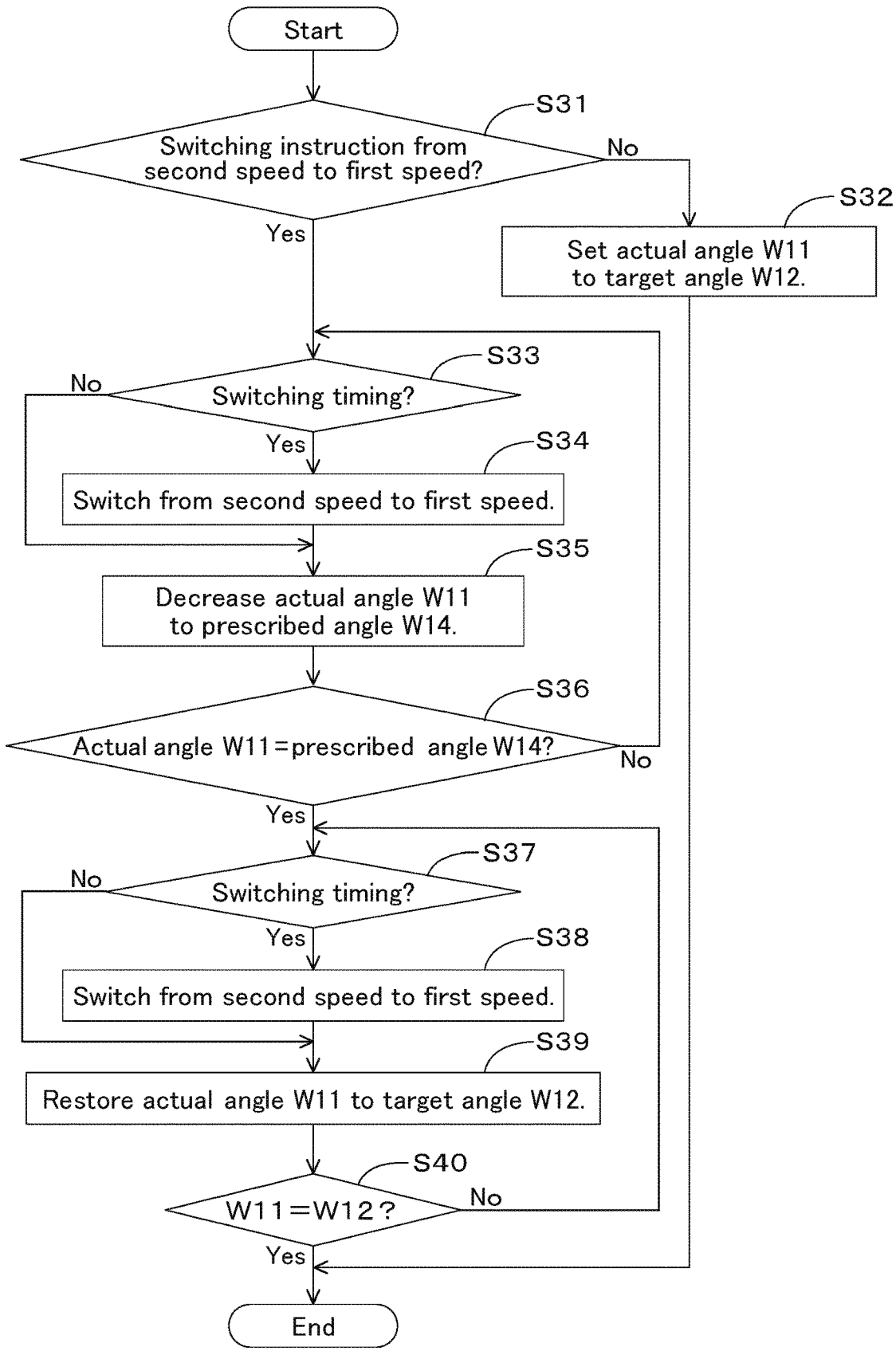
FIG. 5B is a flowchart of a fourth operation of the controller when the speed of the travel motor is decreased.

FIG. 5B is a flowchart of a fourth operation of the controller 60 when the rotation speed of a travel motor is changed from the second speed to the first speed in the third embodiment. Note that the working machine 1 is in a travelling state instead of in a stopped state.

The controller 60 determines whether the switch 61 has been switched from the second speed to the first speed (S31). When the switch 61 has not been switched to the first speed, that is, when the switch 61 is maintained at the second speed (NO in S31), the controller 60 sets the actual angle W11 to the target angle W12 on the basis of the operation of the operation device 154 (S32). When the switch 61 has been switched from the second speed to the first speed (YES in S31), the controller 60 determines whether a timing is a predetermined switching timing from the time point Q31 (S33). When the timing is not the switching timing (NO in S33), the controller 60 proceeds to S35. On the other hand, when the timing is the switching timing (YES in S33), the controller 60 switches the travel switching valve 34 from the second state (the second speed) to the first state (the first speed) (S34). In the case of NO in S33 or after S34, the controller 60 decreases the actual angle W11 to the prescribed angle W13 that is smaller than the target angle W12 (S35). The controller 60 determines whether the actual angle W11 has reached the prescribed angle W13 (S36), and when the actual angle W11 has not reached the prescribed angle W13 (NO in S36), the controller returns to S33. On the other hand, when the actual angle W11 has reached the prescribed angle W13 (YES in S36), the controller 60 determines whether a timing is the switching timing (S37). When the timing is the switching timing (YES in S37), the controller 60 switches the travel switching valve 34 from the second state (the second speed) to the first state (first speed) (S38). On the other hand, when the timing is not the switching timing (NO in S37) or after S38, the controller 60 restores the actual angle W11 to the target angle W12 (S39). The controller 60 determines whether the actual angle W11 has been restored to the target angle W12 (S40), and when the controller 60 determines that the actual angle W11 has not been restored (NO in S40), the controller 60 returns to S37. Note that when the controller 60 determines that the actual angle W11 has been restored to the target angle W12 (YES in S40), the process ends.

Even in the working machine 1 of the third embodiment, the controller 60 changes a delay period lasting up to the switching timing of the travel switching valve 34 from an output timing of a speed-change instruction of the switch (the switch 61) in accordance with the travel pressures detected by the pressure detectors 80 (travel pressure detectors) at the time of a speed-change instruction. Since the changing of the delay period is the same as those in the first and second embodiments above, the changing of the delay period is not described here.

For example, when illustrating this using FIG. 3C of the first embodiment, when a forward-travel-directional travel pressure exceeds the speed-increase first threshold value (YES in S55), the controller 60 selects, as a delay period, the first value that is smaller than the central value (S56). That is, as shown in FIG. 2C and FIG. 2D, the controller 60 changes the delay period from the central value (60 milliseconds) to the first value (40 milliseconds). As shown in FIG. 4A, a delay period Z12 that has been the central value (60 milliseconds) is changed to a delay period Z12A that is shorter than the delay period Z12. On the other hand, when the forward-travel-directional travel pressure does not exceed the speed-increase first threshold value (NO in S55), as shown in FIG. 2C and FIG. 2D, the controller 60 maintains the delay period at the central value (60 milliseconds) (S57). As shown in FIG. 4A, the delay period Z12 is maintained at the central value (60 milliseconds).

When illustrating this using FIG. 3D of the first embodiment, when a rearward-travel-directional travel pressure exceeds the speed-decrease second threshold value (YES in S68), the controller 60 selects, as a delay period, the second value that is larger than the central value (S70). That is, as shown in FIG. 2C and FIG. 2D, the controller 60 changes the delay period from the central value (680 milliseconds) to the second value (700 milliseconds). As shown in FIG. 4B, a delay period Z13 that has been the central value (680 milliseconds) is changed to a delay period Z13A that is longer than the delay period Z13.

Even the working machine 1 of the third embodiment is capable of providing the same effects as those of the working machines 1 of the first and second embodiments above.

Fourth Embodiment

Figure 7A:
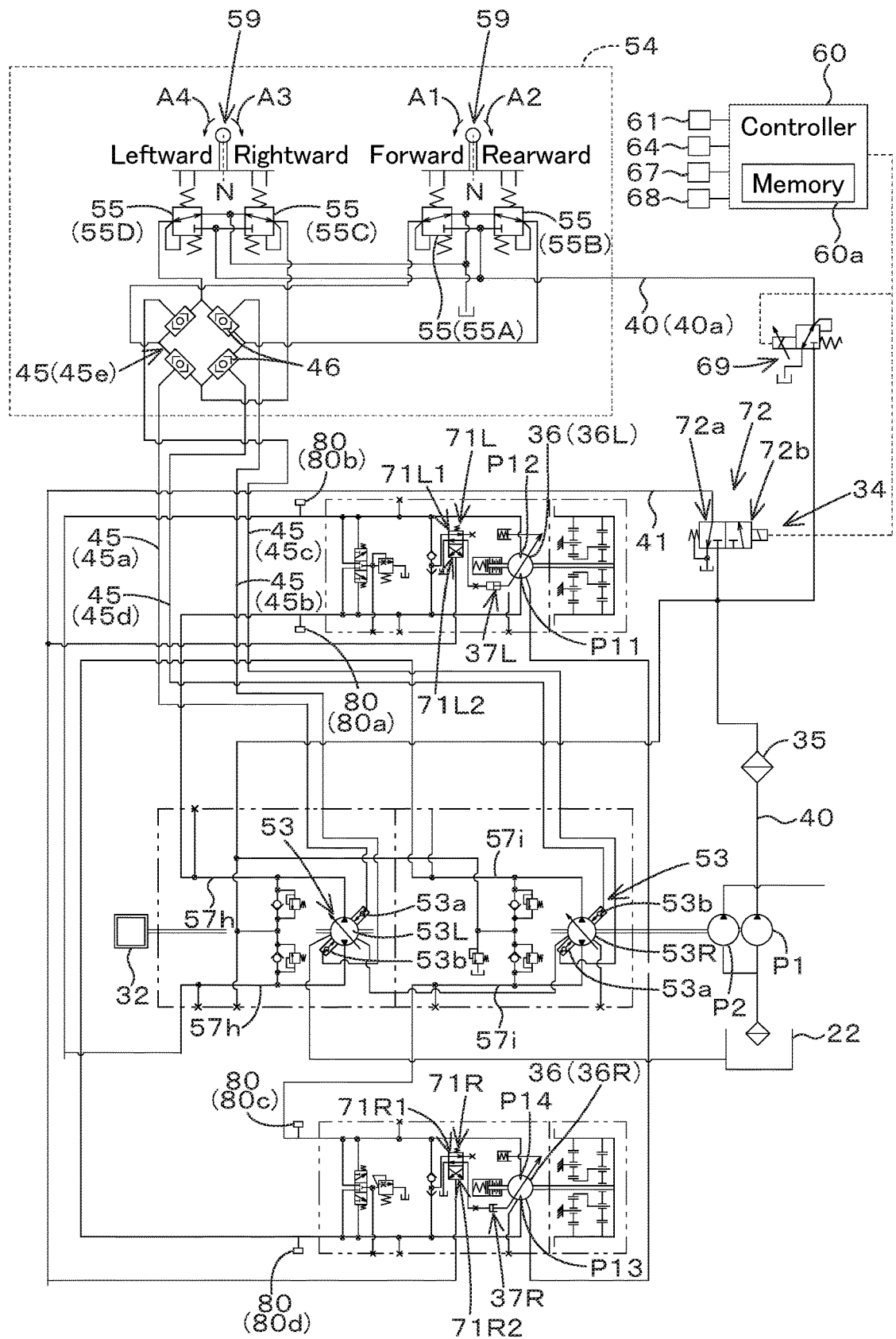
FIG. 7A illustrates a hydraulic system (hydraulic circuit) of a working machine in a fourth embodiment.

Although, in the embodiment described above, the swash-plate angle is changed by the regulator 155, the swash-plate angle may be changed by another method. For example, as shown in FIG. 7A, a delivery fluid passage 40 is a branched passage that branches off in the middle, and a proportional valve 69 is connected to a section 40a extending to a travel operation device 54. The proportional valve 69 is an electromagnetic proportional valve and its opening can be changed by control of a controller 60.

In a state in which an operation lever 59 of the travel operation device 54 is in full stroke, that is, operation valves 55 (55A, 55B, 55C, 55D) are substantially fully open, when the controller 60 has obtained an instruction of switching from a first gear state to a second gear state by a switch 61, the controller 60, by making the opening of the proportional valve 69 smaller than the opening when the switch 61 is being operated, decreases a primary pressure of a hydraulic fluid flowing toward the operation valves 55 and, as in FIG. 4A, causes the swash-plate angles of travel pumps 53 (first travel pump 53L and second travel pump 53R) to be smaller than the present swash-plate angles. After decreasing the swash-plate angles of the travel pumps 53 (the first travel pump 53L and the second travel pump 53R), the controller 60 switches a travel switching valve 34 to the second state and, after switching the travel switching valve 34 to the second state, restores the opening of the proportional valve 69.

In a state in which the operation lever 59 of the travel operation device 54 is in full stroke, when the controller 60 has obtained an instruction of switching from the second gear state to the first gear state by the switch 61, the controller 60, by making the opening of the proportional valve 69 smaller than the opening when the switch 61 is being operated, decreases a primary pressure of a hydraulic fluid flowing toward the operation valves 55 and, as in FIG. 4B, causes the swash-plate angles of the travel pumps 53 (the first travel pump 53L and the second travel pump 53R) to be smaller than the present swash-plate angles. After decreasing the swash-plate angles of the travel pumps 53 (the first travel pump 53L and the second travel pump 53R), the controller 60 switches the travel switching valve 34 to the first state and, after switching the travel switching valve 34 to the first state, restores the opening of the proportional valve 69. Note that whether the operation lever 59 is in full stroke can be determined by the operation amount detected by an operation detector (sensor) 82.

That is, as shown in FIG. 7A, even by using the proportional valve 69 provided in the delivery flow passage 40 (40a), when the speed is increased or decreased, the swash-plate angles of the travel pumps 53 (the first travel pump 53L and the second travel pump 53R) can be decreased.

Even in the working machine 1 of the fourth embodiment, in accordance with the travel pressures detected by pressure detectors 80 (travel pressure detectors) at the time of a speed-change instruction, the controller 60 changes a delay period lasting up to a switching timing of the travel switching valve 34 from an output timing of a speed-change instruction of the switch (the switch 61). Since the changing of the delay period is the same as those in the first and second embodiments above, the changing of the delay period is not described here.

Even the working machine 1 of the fourth embodiment is capable of providing the same effects as those of the working machines 1 of the first and second embodiments above.

Fifth Embodiment

Figure 7B:
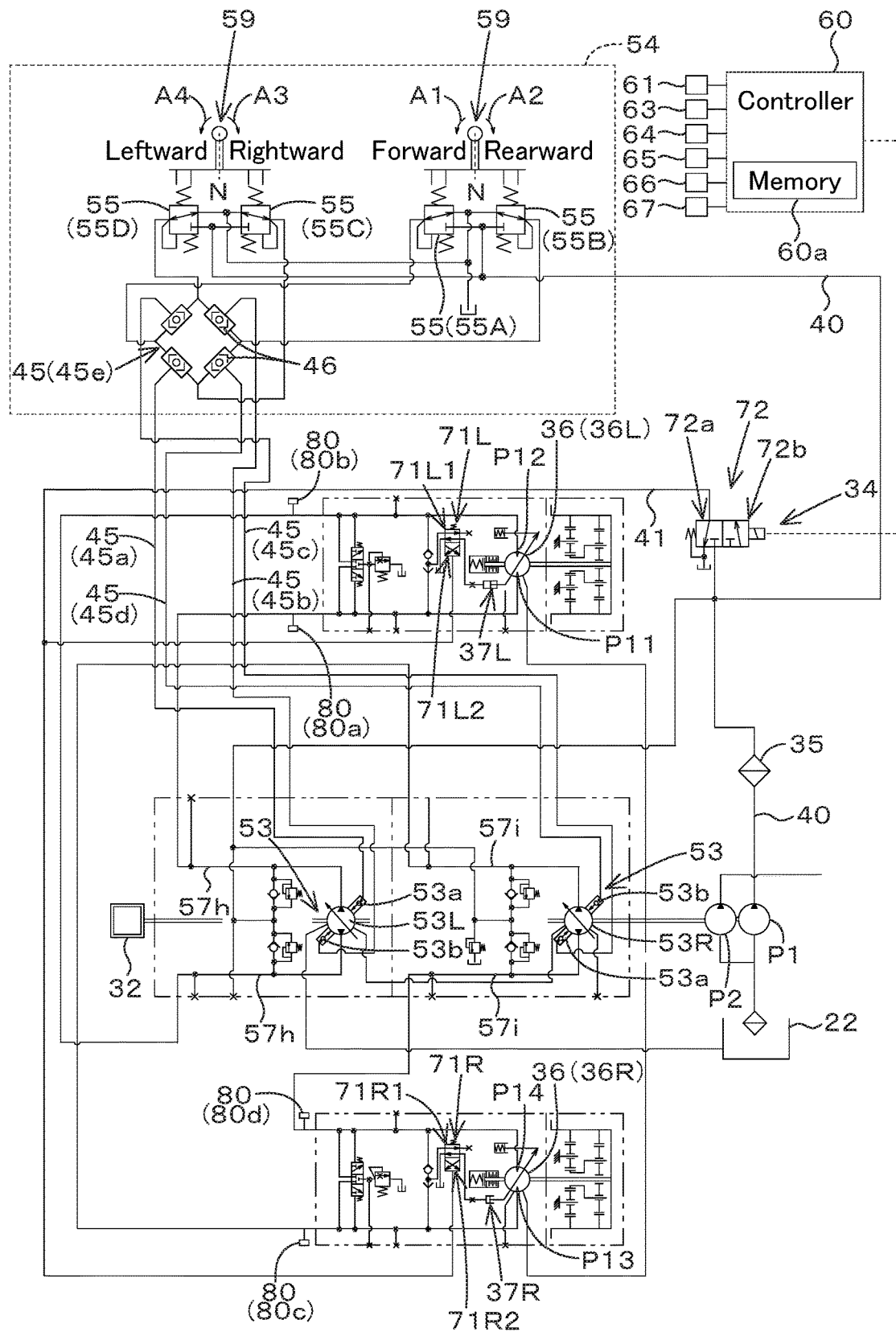
FIG. 7B illustrates a hydraulic system (hydraulic circuit) of a working machine in a fifth embodiment.

A working machine 1 of a fifth embodiment shown in FIG. 7B includes a gradient detector 63 (for example, an acceleration sensor or an inertial measurement sensor) that detects the pitch angle of a machine body 2. When the machine body 2 moves forward or rearward in an ordinary mode that is not a setting mode of setting a speed-change switching timing, if the pitch angle detected by the gradient detector 63 is a positive value, a controller 60 corrects a delay period so that the delay period is decreased in accordance with the magnitude of the pitch angle, and, if the pitch angle detected by the gradient detector 63 is a negative value, the controller 60 corrects the delay period so that the delay period is increased in accordance with the magnitude of the pitch angle.

According to this structure, since the delay period is corrected in accordance with the pitch angle, a speed-change shock occurring when the working machine 1 moves forward or rearward on a rising slope or a descending slope in the ordinary mode can be suitably reduced.

Further, when the machine body 2 moves forward or rearward in the setting mode, if the pitch angle detected by the gradient detector 63 is a positive value, the controller 60 may correct a threshold value so that the threshold value is increased in accordance with the magnitude of the pitch angle, and, if the pitch angle detected by the gradient detector 63 is a negative value, the controller 60 may correct the threshold value so that the threshold value is decreased in accordance with the magnitude of the pitch angle. According to this structure, since the travel pressure is increased at the rising slope, when the threshold value is increased in accordance with the increase of the travel pressure, even if the setting mode of setting the speed-change switching timing is realized at the rising slope, the delay period can be suitably set. In addition, since the travel pressure is decreased at the descending slope, when the threshold value is decreased in accordance with the decrease of the travel pressure, even if the setting mode of setting the speed-change switching timing is realized at the descending slope, the delay period can be suitably set.

Modification 1

In the user switching mode in which a user sets a speed-change switching timing, when the operation lever 59 (operation member) is operated for forward travel and when a speed-increase operation or a speed-decrease operation is performed, the controller 60 determines whether forward-travel-directional travel pressures (that is, the first travel pressure V1 and the third travel pressure V3) detected by the first travel pressure detectors (the first pressure detector 80a and the third pressure detector 80c) exceed a threshold value, and when the controller 60 determines that the threshold value is not exceeded, the controller 60 causes the central value to be a delay period, and when the controller 60 determines that the threshold value is exceeded, the controller 60 causes the first value to be the delay period in place of the central value. According to this structure, in the user switching mode in which a user sets a speed-change switching timing, when the controller 60 determines that the forward-travel-directional travel pressures when the working machine 1 moves forward and the speed-increase operation or the speed-decrease operation is performed exceed the threshold value, the controller 60 changes, as the delay period, the period lasting up to the switching timing of the travel switching valve 34 from the output timing of the speed-change instruction of increasing or decreasing speed at the time of the forward travel to the first value that is a period shorter than the period indicated by the central value. Therefore, in the user switching mode, with regard to the working machine 1 in which there is a shift in the speed-change timing resulting from variations in a delay in responding to the rotation of hydraulic equipment or the prime mover 32, a speed-change shock occurring when the working machine 1 moves forward can be suitably reduced by changing the delay period to the first value that is smaller than the central value when the speed-change shock is insufficiently reduced when the central value is used.

Modification 2

In Modification 2, a delay period at the time of forward travel is internally changed on the basis of operation performance. Specifically, in the ordinary mode that is not the setting mode of setting a speed-change switching timing, when the operation lever 59 (operation member) is operated for forward travel and a speed-increase operation or a speed-decrease operation is performed, the controller 60 determines whether forward-travel-directional travel pressures detected by the first travel pressure detectors exceed a threshold value. When the controller 60 determines that the threshold value is exceeded, the controller 60 may store in the memory 60a a determination result that the threshold value is exceeded, and when the number of determination results reaches a predetermined actual number, the controller 60 may cause the first value to be the delay period in place of the central value.

According to this structure, in the ordinary mode that is not the setting mode, when the number of determination results that the forward-travel-directional travel pressures when the working machine 1 moves forward and when a speed-increase operation or a speed-decrease operation is performed exceed the threshold value reaches the predetermined actual number, the delay period is changed to the first value in place of the central value. Therefore, with regard to the working machine 1 in which there is a shift in the speed-change timing resulting from variations in a delay in responding to the rotation of hydraulic equipment or the prime mover 32, the delay period can be changed to the first value that is smaller than the central value on the basis of a performance result that a speed-change shock is insufficiently reduced when the central value is used. Consequently, the speed-change shock occurring when the working machine 1 moves forward can be suitably reduced on the basis of the performance result.

Further, a delay period at the time of rearward travel may be internally changed on the basis of operation performance. Specifically, in the ordinary mode that is not the setting mode of setting a speed-change switching timing, when the operation lever 59 (operation member) is operated rearward and the speed is decreased, the controller 60 determines whether rearward-travel-directional travel pressures detected by the first travel pressure detectors exceed a threshold value. When the controller 60 determines that the threshold value is exceeded, the controller 60 may store in the memory 60a a determination result that the threshold value is exceeded; and when the number of determination results does not reach a predetermined actual number, the controller 60 may cause the central value to be the delay period, and when the number of determination results reaches the predetermined actual number, the controller 60 may cause the first value to be the delay period.

According to this structure, in the ordinary mode that is not the setting mode, when the determination result that the rearward-travel-directional travel pressures when the working machine 1 moves rearward and the speed is decreased exceed the threshold value reaches the predetermined actual number, the delay period is changed to the first value in place of the central value. Therefore, with regard to the working machine 1 in which there is a shift in the speed-change timing resulting from variations in a delay in responding to the rotation of hydraulic equipment or the prime mover 32, the delay period can be changed to the first value that is smaller than the central value on the basis of a performance result that a speed-change shock is insufficiently reduced when the central value is used. Consequently, the speed-change shock occurring when the working machine 1 moves rearward can be suitably reduced on the basis of the performance result.

Although, in, for example, each of the embodiments above, the pressure detectors 80 (travel pressure detectors) detect the travel pressures at the time of a speed-change instruction, that is, when there has been a speed-change instruction, it is not limited thereto. For example, the pressure detectors 80 may detect the travel pressures before a speed-change instruction, or may detect the travel pressures later than a speed-change instruction. For example, as a structure that detects the travel pressures before a speed-change instruction, the pressure detectors 80 may continually detect the travel pressures, the detected travel pressures and information indicating detection time may be associated with each other and the controller 60 may cause the memory 60a to successively store the detected travel pressures and the information that have been associated with each other, and the travel pressures indicated by a time before a predetermined time from a time point when there has been a speed-change instruction may be read out from the memory 60a. As a structure that detects the travel pressures after a speed-change instruction, the pressure detectors 80 may detect the travel pressures at a time point at which a predetermined period has passed from a time point when there has been a speed-change instruction. These are examples, and structures are not limited thereto.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

Although, in the embodiments described above, the switch (switch 61) is a switch 61 that can be operated, for example, manually by an operator or the like, the switch may be built in the controller 60. When the switch is built in the controller 60, the switch includes a program stored in the controller 60, an electrical component, and an electronic component (electrical circuit and electronic circuit). In this case, the switch of the controller 60 determines whether to switch to the first gear state and the second gear state on the basis of detection information from various detectors of the working machine 1, such as a sensor, and a control signal is output to the travel switching valve 34 on the basis of a determination result. When the travel switching valve 34 has obtained a control signal for the first gear state, the travel switching valve 34 is switched to the first gear state, and when the travel switching valve 34 has obtained a control signal for the second gear state, the travel switching valve 34 is switched to the second gear state.

The travel switching valve 34 is to be a valve that is switchable to the first state in which the travel motors 36 (the first travel motor 36L and the second travel motor 36R) are caused to be in the first speed and that is switchable to the second state in which the travel motors 36 are caused to be in the second speed, and may be a proportional valve differing from a directional switching valve.

The travel motors 36 may be motors having a neutral between the first speed and the second speed.

The travel motors 36 (the first travel motor 36L and the second travel motor 36R) may be axial piston motors or radial piston motors. When the travel motors are radial piston gears, due to the motor capacity being increased, the travel motors 36 can be switched to the first speed, and, due to the motor capacity being decreased, the travel motors 36 can be switched to the second speed.

Since the travel speed changes by operating the operation lever 59, the travel detector 67 may be a device that detects the travel speed on the basis of the operation amount (operation angle) and the operation position of the operation lever 59. As described above, since the second speed (the second state) is to be higher than the first speed (the first state), the shift stages of the working machine are not limited to two stages and may be many stages (a plurality of stages).

What is claimed is:

1. A working machine, comprising:
a prime mover;
a travel pump driven by power of the prime mover to deliver a hydraulic fluid;
a travel motor rotated by the hydraulic fluid delivered by the travel pump;
a machine body where the prime mover, the travel pump, and the travel motor are provided;
a travel switching valve switchable to a first state in which a rotation speed of the travel motor is capable of being increased up to a first maximum speed, and to a second state in which the rotation speed of the travel motor is capable of being increased up to a second maximum speed that is greater than the first maximum speed;
a travel operation device including an operation valve operable to change a pressure of a hydraulic fluid to operate the travel pump in accordance with an operation of an operation member;
a controller configured or programmed to decrease a supply amount of a hydraulic fluid from the travel pump to the travel motor based on a travel state of the machine body when performing either one of a speed-increase operation of switching the travel switching valve from the first state to the second state and a speed-decrease operation of switching the travel switching valve from the second state to the first state;
a switch operable to output a speed-change instruction such as to cause the controller to perform either the speed-increase operation or the speed-decrease operation; and
at least one travel pressure detector which is at least one pressure detector connected to a fluid passage connecting the travel pump and the travel motor to each other and configured to detect a pressure in the fluid passage as a travel pressure that is a pressure of the hydraulic fluid delivered by the travel pump to the travel motor, wherein
in accordance with the travel pressure detected by the at least one travel pressure detector, the controller changes a delay period lasting up to a switching timing of switching the travel switching valve from an output timing of outputting the speed-change instruction from the switch;

the at least one travel pressure detector includes a first travel pressure detector to detect a forward-travel-directional travel pressure that is a pressure of the hydraulic fluid supplied from the travel pump to the travel motor when the travel motor rotates in a normal direction to cause forward travel of the machine body; and the controller, when performing the speed-increase operation or the speed-decrease operation, changes the delay period in accordance with the forward-travel-directional travel pressure detected by the first travel pressure detector;

the controller, when performing the speed-increase operation, decreases the delay period if the forward-travel-directional travel pressure detected by the first travel pressure detector exceeds a threshold value.

2. The working machine according to claim 1, wherein the controller, when performing the speed-decrease operation, decreases the delay period if the forward-travel-directional travel pressure detected by the first travel pressure detector exceeds a threshold value.

3. The working machine according to claim 1, wherein the at least one travel pressure detector includes a second travel pressure detector to detect a rearward-travel-directional travel pressure that is a pressure of the hydraulic fluid delivered from the travel motor to the travel pump when the travel motor rotates in the normal direction, and the controller, when performing the speed-decrease operation, increases the delay period if the rearward-travel-directional travel pressure detected by the second travel pressure detector exceeds a threshold value.

4. The working machine according to claim 3, further comprising:

a memory including a memory table to store at least the threshold value, a central value indicating a predetermined period from an output timing of outputting the speed-change instruction from the switch, and a second value indicating a second period that is longer than the period indicated by the central value; and a rotation detection sensor to detect a rotation speed of the prime mover, wherein the memory stores each of the threshold value, the central value, and the second value corresponding to the rotation speed of the prime mover, when the operation member is operated for the forward travel and the controller performs the speed-decrease operation, the controller determines whether the rearward-travel-directional travel pressure detected by the second travel pressure detector exceeds the threshold value by using the threshold value, the central value, and the second value corresponding to the rotation speed of the prime mover detected by the rotation detection sensor, and when the controller determines that the threshold value is not exceeded, the controller causes the central value to be the delay period, and when the controller determines that the threshold value is exceeded, the controller causes the second value to be the delay period in place of the central value.

5. The working machine according to claim 1, wherein when a mode is a setting mode of setting a speed-change switching timing, the controller changes the delay period.

6. The working machine according to claim 1, wherein the first travel pressure detector detects a rearward-travel-directional travel pressure that is a pressure of the hydraulic fluid supplied from the travel pump to the travel motor when the travel motor rotates in a reverse direction to cause rearward travel of the machine body, and the controller, when performing the speed-increase operation or the speed-decrease operation, changes the delay period in accordance with the rearward-travel-directional travel pressure detected by the first travel pressure detector.

7. The working machine according to claim 6, further comprising:

a memory including a memory table to store at least a threshold value, a central value indicating a predetermined period from an output timing of outputting the speed-change instruction from the switch, and a first value indicating a first period that is shorter than the period indicated by the central value, wherein in a user switching mode in which a user sets a speed-change switching timing, when the operation member is operated for rearward travel of the machine body and the controller performs the speed-decrease operation, the controller determines whether the rearward-travel-directional travel pressure detected by the first travel pressure detector exceeds the threshold value, when the controller determines that the threshold value is not exceeded, the controller causes the central value to be the delay period, and when the controller determines that the threshold value is exceeded, the controller causes the first value to be the delay period in place of the central value.

8. The working machine according to claim 6, further comprising:

a memory including a memory table to store at least a threshold value, a central value indicating a predetermined period from an output timing of outputting the speed-change instruction from the switch, and a first value indicating a first period that is shorter than the period indicated by the central value, wherein in a mode that is not a setting mode of setting a speed-change switching timing, when the operation member is operated for the rearward travel of the machine body and the controller performs the speed-decrease operation, the controller determines whether the rearward-travel-directional travel pressure detected by the first travel pressure detector exceeds the threshold value, when the controller determines that the threshold value is exceeded, the controller stores in the memory a determination result that the threshold value is exceeded, and when the number of determination results does not reach a predetermined actual number, the controller causes the central value to be the delay period and when the number of determination results reaches the predetermined actual number, the controller causes the first value to be the delay period.

9. The working machine according to claim 1, further comprising:

a memory including a memory table to store at least the threshold value, a central value indicating a predetermined period from an output timing of outputting the speed-change instruction from the switch, and a first value indicating a first period that is shorter than the period indicated by the central value; and a rotation detection sensor to detect a rotation speed of the prime mover, wherein the memory stores each of the threshold value, the central value, and the first value corresponding to the rotation speed of the prime mover, when the operation member is operated for the forward travel and the controller performs the speed-increase operation or the speed-decrease operation, the controller determines whether the forward-travel-directional travel pressure detected by the first travel pressure detector exceeds the threshold value by using the threshold value, the central value, and the first value corresponding to the rotation speed of the prime mover detected by the rotation detection sensor, when the controller determines that the threshold value is not exceeded, the controller causes the central value to be the delay period, and when the controller determines that the threshold value is exceeded, the controller causes the first value to be the delay period.

10. The working machine according to claim 9, wherein the threshold value when the speed-increase operation is performed and the threshold value when the speed-decrease operation is performed differ from each other.

11. The working machine according to claim 9, wherein in a user switching mode in which a user sets a speed-change switching timing, when the operation member is operated for the forward travel and the controller performs the speed-increase operation or the speed-decrease operation, the controller determines whether the forward-travel-directional travel pressure detected by the first travel pressure detector exceeds the threshold value, when the controller determines that the threshold value is not exceeded, the controller causes the central value to be the delay period, and when the controller determines that the threshold value is exceeded, the controller causes the first value to be the delay period in place of the central value.

12. The working machine according to claim 9, wherein in a mode that is not a setting mode of setting a speed-change switching timing, when the operation member is operated for the forward travel and the controller performs the speed-increase operation or the speed-decrease operation, the controller determines whether the forward-travel-directional travel pressure detected by the first travel pressure detector exceeds the threshold value, and when the controller determines that the threshold value is exceeded, the controller stores in the memory a determination result that the threshold value is exceeded, and when the number of determination results reaches a predetermined actual number, the controller causes the first value to be the delay period in place of the central value.

13. A working machine comprising:
a prime mover;
a travel pump driven by power of the prime mover to deliver a hydraulic fluid;
a travel motor rotated by the hydraulic fluid delivered by the travel pump;
a machine body where the prime mover, the travel pump, and the travel motor are provided;
a travel switching valve switchable to a first state in which a rotation speed of the travel motor is capable of being increased up to a first maximum speed, and to a second state in which the rotation speed of the travel motor is capable of being increased up to a second maximum speed that is greater than the first maximum speed;
a travel operation device including an operation valve operable to change a pressure of a hydraulic fluid to operate the travel pump in accordance with an operation of an operation member;
a controller configured or programmed to decrease a supply amount of a hydraulic fluid from the travel pump to the travel motor based on a travel state of the machine body when performing either one of a speed-increase operation of switching the travel switching valve from the first state to the second state and a speed-decrease operation of switching the travel switching valve from the second state to the first state;
a switch operable to output a speed-change instruction such as to cause the controller to perform either the speed-increase operation or the speed-decrease operation; and
at least one travel pressure detector which is at least one pressure detector connected to a fluid passage connecting the travel pump and the travel motor to each other and configured to detect a pressure in the fluid passage as a travel pressure that is a pressure of the hydraulic fluid delivered by the travel pump to the travel motor, wherein in accordance with the travel pressure detected by the at least one travel pressure detector, the controller changes a delay period lasting up to a switching timing of switching the travel switching valve from an output timing of outputting the speed-change instruction from the switch;

the at least one travel pressure detector includes a first travel pressure detector to detect, a forward-travel-directional travel pressure that is a pressure of the hydraulic fluid supplied from the travel pump to the travel motor when the travel motor rotates in a normal direction to cause forward travel of the machine body, and a second travel pressure detector to detect a rearward-travel-directional travel pressure that is a pressure of the hydraulic fluid delivered from the travel motor to the travel pump when the travel motor rotates in the normal direction, and the controller, when performing the speed-increase operation or the speed-decrease operation, changes the delay period in accordance with a difference between the forward-travel-directional travel pressure detected by the first travel pressure detector and the rearward-travel-directional travel pressure detected by the second travel pressure detector.

14. The working machine according to claim 13, wherein the controller, when performing the speed-increase operation, decreases the delay period if the difference between the forward-travel-directional travel pressure detected by the first travel pressure detector and the rearward-travel-directional travel pressure detected by the second travel pressure detector is a positive value and an absolute value of the difference exceeds a determination value.

15. The working machine according to claim 13, wherein the controller, when performing the speed-decrease operation, decreases the delay period if the difference between the forward-travel-directional travel pressure detected by the first travel pressure detector and the rearward-travel-directional travel pressure detected by the second travel pressure detector is a positive value and an absolute value of the difference exceeds a determination value.

16. The working machine according to claim 13, wherein the controller, when performing the speed-decrease operation, increases the delay period if the difference between the forward-travel-directional travel pressure detected by the first travel pressure detector and the rearward-travel-directional travel pressure detected by the second travel pressure detector is a negative value and an absolute value of the difference exceeds a determination value.

17. A working machine, comprising:
a prime mover;
a travel pump driven by power of the prime mover to deliver a hydraulic fluid;
a travel motor rotated by the hydraulic fluid delivered by the travel pump;
a machine body where the prime mover, the travel pump, and the travel motor are provided;
a travel switching valve switchable to a first state in which a rotation speed of the travel motor is capable of being increased up to a first maximum speed, and to a second state in which the rotation speed of the travel motor is capable of being increased up to a second maximum speed that is greater than the first maximum speed;
a travel operation device including an operation valve operable to change a pressure of a hydraulic fluid to operate the travel pump in accordance with an operation of an operation member;
a controller configured or programmed to decrease a supply amount of a hydraulic fluid from the travel pump to the travel motor based on a travel state of the machine body when performing either one of a speed-increase operation of switching the travel switching valve from the first state to the second state and a speed-decrease operation of switching the travel switching valve from the second state to the first state;
a switch operable to output a speed-change instruction such as to cause the controller to perform either the speed-increase operation or the speed-decrease operation; and
at least one travel pressure detector which is at least one pressure detector connected to a fluid passage connecting the travel pump and the travel motor to each other and configured to detect a pressure in the fluid passage as a travel pressure that is a pressure of the hydraulic fluid delivered by the travel pump to the travel motor, wherein
in accordance with the travel pressure detected by the at least one travel pressure detector, the controller changes a delay period lasting up to a switching timing of switching the travel switching valve from an output timing of outputting the speed-change instruction from the switch;
the working machine further includes a gradient detector which is a sensor to detect a pitch angle of the machine body,
during forward or rearward travel of the machine body,
if the pitch angle detected by the gradient detector is a positive value, the controller corrects the delay period so that the delay period is decreased in accordance with a magnitude of the pitch angle, and
if the pitch angle detected by the gradient detector is a negative value, the controller corrects the delay period so that the delay period is increased in accordance with the magnitude of the pitch angle.

18. The working machine according to claim 17, wherein
in a setting mode of setting a speed-change switching timing, during the forward or rearward travel of the machine body,
if the pitch angle detected by the gradient detector is a positive value, the controller corrects a threshold value so that the threshold value is increased in accordance with the magnitude of the pitch angle, and
if the pitch angle detected by the gradient detector is a negative value, the controller corrects the threshold value so that the threshold value is decreased in accordance with the magnitude of the pitch angle.

* * * * *